(12) United States Patent
Takami et al.

(10) Patent No.: US 8,512,590 B2
(45) Date of Patent: Aug. 20, 2013

(54) ROTATING MACHINE, BONDED MAGNET, MAGNET ROLL, AND METHOD FOR PRODUCING SINTERED FERRITE MAGNET

(75) Inventors: Takashi Takami, Saitama (JP); Hiroshi Iwasaki, Saitama (JP); Yoshinori Kobayashi, Saitama (JP); Naoki Mochi, Saitama (JP); Ryuji Gotoh, Gunma (JP)

(73) Assignee: Hitachi Metals, Ltd., Tokyo (JP)

( * ) Notice: Subject to any disclaimer, the term of this patent is extended or adjusted under 35 U.S.C. 154(b) by 90 days.

(21) Appl. No.: 13/211,422

(22) Filed: Aug. 17, 2011

(65) Prior Publication Data

US 2012/0211910 A1    Aug. 23, 2012

Related U.S. Application Data

(62) Division of application No. 12/281,898, filed as application No. PCT/JP2007/052525 on Feb. 13, 2007, now Pat. No. 8,303,837.

(30) Foreign Application Priority Data

Mar. 10, 2006 (JP) ................................. 2006-066758
Jun. 16, 2006 (JP) ................................. 2006-167349

(51) Int. Cl.
*H01F 1/11* (2006.01)
*H02K 15/03* (2006.01)

(52) U.S. Cl.
USPC ................. 252/62.63; 264/37.28; 264/37.29; 264/611

(58) Field of Classification Search
USPC ................. 264/37.28, 37.29, 611; 252/62.63
See application file for complete search history.

(56) References Cited

U.S. PATENT DOCUMENTS

| 6,402,980 | B1 | 6/2002 | Taguchi et al. |
|---|---|---|---|
| 6,994,797 | B2 | 2/2006 | Oda et al. |
| 7,837,893 | B2 | 11/2010 | Takami et al. |
| 7,906,036 | B2 | 3/2011 | Takami et al. |

FOREIGN PATENT DOCUMENTS

| JP | 11-97225 A | 4/1999 |
|---|---|---|
| JP | 2000-223307 | 8/2000 |
| JP | 2003-151811 A | 5/2003 |
| WO | 2005/027153 A1 | 3/2005 |
| WO | 2006/028185 A1 | 3/2006 |

*Primary Examiner* — Carol M Koslow
(74) *Attorney, Agent, or Firm* — Sughrue Mion, PLLC

(57) ABSTRACT

A method for producing a sintered ferrite magnet having an M-type ferrite structure and represented by: $Ca_{1-x-y}R_xBa_yFe_{2n-z}Co_z$, (by atomic ratio), where $0.3 \leq 1-x-y \leq 0.65$, $0.2 \leq x \leq 0.65$, $0.001 \leq y \leq 0.2$, $0.03 \leq z \leq 0.65$, $4 \leq n \leq 7$, and $1-x-y>y$. The method includes mixing a Ca compound, an R element compound, a Ba compound, an iron compound and a Co compound as starting materials; calcining the starting materials to obtain calcined bodies; pulverizing the calcined bodies to obtain a calcined powder; providing recycled materials having an M-type ferrite structure and being represented by the above formula; pulverizing the recycled materials to obtain a recycled material powder; mixing the recycled material powder with the calcined powder to form a moldable material; molding the moldable material to obtain green bodies; and sintering the green bodies to obtain the sintered ferrite magnet.

8 Claims, 10 Drawing Sheets

ROTATING MACHINE, BONDED MAGNET, MAGNET ROLL, AND METHOD FOR PRODUCING SINTERED FERRITE MAGNET

CROSS REFERENCE TO RELATED APPLICATION

This application is a Divisional of application Ser. No. 12/281,898, filed Oct. 29, 2008, which is a National Stage of International Application No. PCT/JP2007/052525 filed Feb. 13, 2007, claiming priority based on Japanese Patent Application Nos. 2006-066758, filed Mar. 10, 2006 and 2006-167349, filed Jun. 16, 2006, the contents of all of which are incorporated herein by reference in its entirety.

FIELD OF THE INVENTION

The present invention relates to a rotating machine comprising a new, high-performance, sintered ferrite magnet having higher residual magnetic flux density Br and intrinsic coercivity HcJ and a smaller temperature dependency of HcJ than those of conventional sintered ferrite magnets, a bonded magnet and a magnet roll. The present invention also relates to a method for producing the above new, high-performance, sintered ferrite magnet.

BACKGROUND OF THE INVENTION

Magnetoplumbite-type (M-type), sintered ferrite magnets are used in various applications including rotating machines such as motors, generators, etc. To provide smaller and lighter rotating machines for automobiles, and higher-efficiency rotating machines for electric apparatuses, sintered ferrite magnets having higher magnetic properties are recently demanded. Particularly demanded to provide smaller and lighter rotating machines for automobiles are sintered ferrite magnets having high Br, as well as high HcJ that enables the magnets to avoid losing magnetism by a demagnetization field generated when made thinner.

M-type, sintered ferrite magnets such as Sr ferrite, Ba ferrite, etc. are produced by the steps of (a) mixing iron oxide with a carbonate of Sr, Ba, etc., (b) calcining the resultant mixture to cause ferritization to obtain calcined clinker, (c) subjecting the calcined clinker to coarse pulverization and wet, fine pulverization to an average particle size of about 0.5 µm together with $SiO_2$, $SrCO_3$, $CaCO_3$, etc. for controlling sintering, $Al_2O_3$ or $Cr_2O_3$ (if necessary) for controlling HcJ, and water, (d) molding slurry of fine ferrite particles in a magnetic field and drying them, and (e) sintering the resultant molding. Sintered ferrite magnets are machined to shapes for applications.

In the above production method, if fine particles in the slurry after wet, fine pulverization have a small average particle size, the removal of water from a green body during molding in a magnetic field takes an extremely long period of time, resulting in drastically reduced molding efficiency (number of moldings obtained per a unit time), and thus more expensive sintered ferrite magnets. This problem is particularly severe at an average particle size of less than 0.7 µm. Although a larger average particle size improves the molding efficiency, the resultant sintered ferrite magnets have low magnetic properties. In dry molding, too, fine pulverization lowers the molding efficiency, needing magnetic powder having a large average particle size to some extent.

Japanese Patent 3181559 discloses a sintered ferrite magnet comprising hexagonal crystal ferrite as a main phase, and having a composition represented by the general formula of $Ca_{1-x}R_x(Fe_{12-y}M_y)_zO_{19}$, wherein R is at least one element selected from the group consisting of rare earth elements including Y and Bi, La being indispensable, M is Co and/or Ni, x, y and z meet the conditions of $0.2 \leq x \leq 0.8$, $0.2 \leq y \leq 1.0$, and $0.5 \leq z \leq 1.2$. Japanese Patent 3181559 describes in the paragraph [0018] and Example 6 that the sintered ferrite magnet has about 2% higher saturation magnetization ($4\pi$Is) and about 10% higher anisotropic magnetic field ($H_A$) than those of Sr ferrite (Sr M). Sintered ferrite magnets having such high properties are expected to have high potential not achieved by the Sr M. Namely, Br of 4.6 kG (460 mT) or more and about 10% increase of the maximum HcJ are expected. However, Japanese Patent 3181559 shows in FIG. 2 that the magnetic properties of Sample 2 of Example 2 (sintered with 20% of $O_2$) are Br of 4.4 kG (440 mT) and HcJ of 3.93 kOe (313 kA/m), much lower than expected. Thus, there is much room for improvement.

JP 11-97225 A discloses an anisotropic, sintered magnet comprising hexagonal, magnetoplumbite-type ferrite as a main phase, and having a composition of Ba, R, Fe and M represented by the general formula of $Ba_{1-x}R_x(Fe_{12-y}M_y)_zO_{19}$, wherein R is at least one element selected from the group consisting of rare earth elements (including Y) and Bi, M is Co or (Co+Zn), $0.04 \leq x \leq 0.9$, $0.3 \leq y \leq 0.8$, and $0.7 \leq z \leq 1.2$. Calcined bodies corresponding to the anisotropic sintered magnets shows in Table 1 of JP 11-97225 A have compositions containing particularly a smaller amount of Ca, outside the basic composition range of the present invention. Also, the magnetic properties (Br and HcJ shown in FIG. 1) of the sintered ferrite bodies are not necessarily satisfactory for high-performance demand.

WO 05/027153 A discloses a sintered ferrite magnet having an M-type ferrite structure, and produced from A elements such as Sr or Sr and Ba, an R element that is at least one of rare earth elements including Y and indispensably includes La, Ca, Fe and Co as indispensable elements, by pulverizing, molding and sintering an oxide-type, magnetic material. The oxide-type, magnetic material is represented by the general formula (1) of $A_{1-x-y}Ca_xR_yFe_{2n-z}Co_zO_{19}$ (by atomic ratio), and the sintered ferrite magnet is represented by the general formula (2) of $A_{1-x-y+a}Ca_{x+b}R_{y+c}Fe_{2n-z}Co_{z+d}O_{19}$ (by atomic ratio). In the formulae (1) and (2), x, y, z and n represent the contents of Ca, the R element and Co and a molar ratio, and a, b, c and d represent the amounts of the A elements, Ca, the R element and Co added in the pulverizing step, meeting $0.03 \leq x \leq 0.4$, $0.1 \leq y \leq 0.6$, $0 \leq z \leq 0.4$, $4 \leq n \leq 10$, $x+y<1$, $0.03 \leq x+b \leq 0.4$, $0.1 \leq y+c \leq 0.6$, $0.1 \leq z+d \leq 0.4$, $0.50 \leq (1-x-y+a)/(1-y+a+b) \leq 0.97$, $1.1 \leq (y+c)/(z+d) \leq 1.8$, $1.0 \leq (y+c)/x \leq 20$, and $0.1 \leq x/(z+d) \leq 1.2$. This sintered ferrite magnet is outside the basic composition range of the present invention in that Sr is contained indispensably, and that the content of Sr or (Sr+Ba) is more than the Ca content. Although the sintered ferrite magnet described in WO 05/027153 A has high magnetic properties, it still fails to meet increasingly higher users' demand for performance. Further improvement of the magnetic properties is thus demanded.

WO 06/028185 A discloses an oxide-type, magnetic material comprising hexagonal, M-type magnetoplumbite ferrite as a main phase, which has a composition represented by the formula of $(1-x)CaO-(x/2)R_2O_3-(n-y/2)Fe_2O_3-yMO$, wherein R is at least one element selected from the group consisting of La, Nd and Pr, indispensably including La, M is at least one element selected from the group consisting of Co, Zn, Ni and Mn, indispensably including Co, and x, y, n are molar ratios meeting $0.4 \leq x \leq 0.6$, $0.2 \leq y \leq 0.35$, $4 \leq n \leq 6$, and $1.4 \leq x/y \leq 2.5$. Because of Ba-free, the oxide-type, magnetic material described in WO 06/028185 A is outside the basic composition range of the present invention, and its magnetic performance is unsatisfactory for recent demand for higher performance.

OBJECTS OF THE INVENTION

Accordingly, an object of the present invention is to provide a rotating machine comprising a new, high-performance, sintered ferrite magnet having higher Br and HcJ and a smaller temperature dependency of HcJ than those of conventional ones, a bonded magnet and a magnet roll.

Another object of the present invention is to provide a method for producing such a high-performance, sintered ferrite magnet.

DISCLOSURE OF THE INVENTION

As a result of intense research in view of the above objects, the inventors have found that a sintered ferrite magnet having an M-type ferrite structure and comprising Ca, an R element that is at least one of rare earth elements and indispensably includes La, Ba, Fe and Co as indispensable elements has high Br and HcJ and a small temperature dependency of HcJ. The present invention has been completed based on such finding.

Thus, the rotating machine of the present invention comprises a sintered ferrite magnet having an M-type ferrite structure, comprising Ca, an R element that is at least one of rare earth elements and indispensably includes La, Ba, Fe and Co as indispensable elements, and having a composition represented by the following general formula:

$$Ca_{1-x-y}R_xBa_yFe_{2n-z}Co_z \text{ (by atomic ratio),}$$

wherein (1−x−y), x, y, z and n represent the contents of Ca, the R element, Ba and Co, and a molar ratio, meeting
0.3≦1−x−y≦0.65,
0.2≦x≦0.65,
0.001≦y≦0.2,
0.03≦z≦0.65,
4≦n≦7, and
1−x−y>y.

The sintered ferrite magnet preferably has intrinsic coercivity $HcJ_{293}$ (kA/m) at 293 K and a temperature coefficient β (%/K) of intrinsic coercivity HcJ between 233 K and 413 K, meeting the flowing formulae:

$$0<\beta \leq -0.0009 \times HcJ_{293}+0.445, \text{ and}$$

$$HcJ_{293} \geq 264.$$

Good performance as a rotating machine can be obtained, when the sintered ferrite magnet has a composition meeting 1≦x/z≦3 and anisotropy, and comprises M-type crystal grains having an average crystal grain size of 0.9 μm or more in an anisotropy-providing direction, the percentage of M-type crystal grains having aspect ratios (grain size/thickness) of 3 or less being 30% or more, preferably 50% or more, further preferably 60% or more.

The method of the present invention for producing the above sintered ferrite magnet comprises a step of mixing starting materials, a calcining step, a pulverizing step, a molding step, and a sintering step, a moldable material being prepared using at least one of failed green bodies generated in the molding step, failed sintered bodies generated in the sintering step and dust generated in the machining of the sintered bodies, molded and sintered.

In the production method of the sintered ferrite magnet, the sintered ferrite magnet preferably has a composition meeting 1≦x/z≦3.

In the production method of the sintered ferrite magnet, the failed green bodies, the failed sintered bodies and the dust generated in the machining of the sintered bodies are preferably made of a ferrite composition based on an M-type ferrite structure to obtain high magnetic properties.

In the production method of the sintered ferrite magnet, the failed sintered bodies and the dust generated in the machining of the sintered bodies are preferably made of a ferrite composition having an M-type ferrite structure to obtain a stable M-type ferrite structure and high magnetic properties.

In the sintered ferrite magnet, a Sr compound may be added in the mixing step and/or the pulverizing step to substitute 50% or less of the Ba content (y) with Sr.

The sintered ferrite magnet preferably has a composition represented by the following general formula:

$$Ca_{1-x-y}R_xBa_yFe_{2n-z}Co_zO_\alpha \text{ (by atomic ratio),}$$

wherein (1−x−y), x, y, z, n and α represent the contents of Ca, the R element, Ba and Co, a molar ratio, and the content of O, meeting
0.3≦1−x−y≦0.65,
0.2≦x≦0.65,
0.001≦y≦0.2,
0.03≦z≦0.65,
4≦n≦7,
1−x−y>y, and
α=19 at a stoichiometric composition in which x=z, and n=6.

The bonded magnet of the present invention comprises ferrite powder and a binder, the ferrite powder having an M-type ferrite structure, comprising Ca, an R element that is at least one of rare earth elements and indispensably includes La, Ba, Fe and Co as indispensable elements, and having a composition represented by the following general formula:

$$Ca_{1-x-y}R_xBa_yFe_{2n-z}Co_z \text{ (by atomic ratio),}$$

wherein (1−x−y), x, y, z and n represent the contents of Ca, the R element, Ba and Co, and a molar ratio, meeting
0.3≦1−x−y≦0.65,
0.2≦x≦0.65,
0.001≦y≦0.2,
0.03≦z≦0.65,
4≦n≦7, and
1−x−y>y.

At least one magnetic pole portion of the magnet roll of the present invention is preferably constituted by the bonded magnet.

DESCRIPTION OF THE PREFERRED EMBODIMENTS

Figure 1:
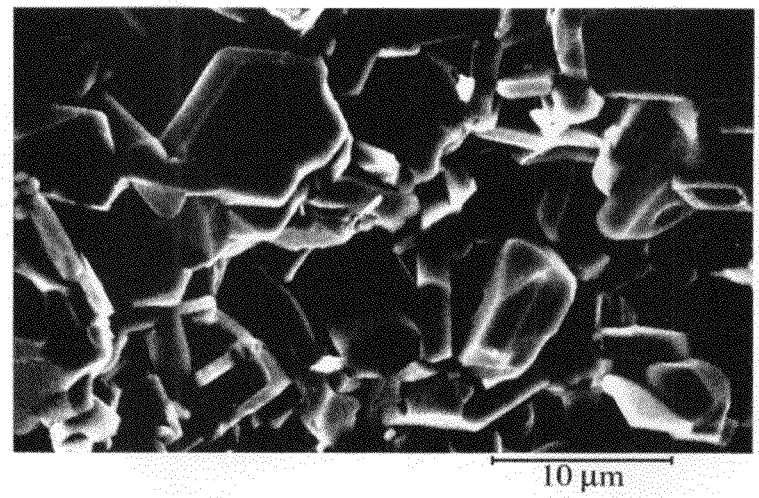
FIG. 1 is a SEM photograph showing a fractured surface of the calcined body of Example 1 of the present invention.

[1] Composition (A) Composition of Oxide-Type, Magnetic Material

Materials for the sintered ferrite magnet and the ferrite powder for bonded magnets in the present invention are preferably oxide-type, magnetic materials based on ferrite having a hexagonal crystal structure, comprising Ca, an R element that is at least one of rare earth elements and indispensably includes La, Ba, Fe and Co as indispensable elements, and having a basic composition represented by the following general formula:

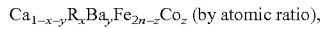

$Ca_{1-x-y}R_xBa_yFe_{2n-z}Co_z$ (by atomic ratio), wherein (1−x−y), x, y, z and n represent the contents of Ca, the R element, Ba and Co, and a molar ratio, meeting $0.3 \leq 1-x-y \leq 0.6$,
$0.2 \leq x \leq 0.65$,
$0.001 \leq y \leq 0.2$,
$0.03 \leq z \leq 0.65$, and
$4 \leq n \leq 7$.

The oxide-type, magnetic materials are preferably in the form of a calcined body.

The Ca content (1−x−y) is preferably 0.3-0.6, more preferably 0.35-0.55. When (1−x−y) is less than 0.3, the M phase is not formed stably, and an excess R element forms orthoferrite, resulting in poor magnetic properties. When (1−x−y) exceeds 0.6, undesirable phases such as $CaFeO_{3-x}$ are formed.

The molar ratio x/z of the R element to Co meets preferably $0.31 \leq x/z \leq 21.7$, more preferably $1 \leq x/z \leq 3$, further preferably $1.2 \leq x/z \leq 2$. When x/z is less than 0.31, undesirable phases containing much Co are extremely formed, resulting in an extremely poor squareness ratio (Hk/HcJ). When x/z exceeds 21.7, undesirable phases such as orthoferrite are extremely formed, resulting in drastically deteriorated magnetic properties.

R is at least one of rare earth elements such as La, Ce, Nd, Pr, etc., and indispensably includes La. To have high magnetic properties, a ratio of La in the R element is preferably 50 atomic % or more, more preferably 70 atomic % or more, particularly La alone except for inevitable impurities. Because La is most easily dissolved in the M phase among the R elements, a higher La ratio results in higher magnetic properties. The R content (x) is preferably 0.2-0.65, more preferably 0.3-0.6, most preferably 0.35-0.55, particularly 0.4-0.5. When x is less than 0.2, a sufficient amount of Co is not contained in the M phase, thereby making the M-type ferrite structure unstable, and forming undesirable phases such as $CaO$—$Fe_2O_3$, $CaO$-$2Fe_2O_3$, etc., resulting in drastically deteriorated magnetic properties. When x exceeds 0.65, oxides of the unreacted R elements increase, thereby further forming undesirable phases such as orthoferrite, etc.

The Ba content (y) is preferably 0.001-0.2, more preferably 0.005-0.2, most preferably 0.01-0.2, particularly preferably 0.02-0.15, most preferably 0.02-0.12. When y is less than 0.001, the addition of Ba fails to improve magnetic properties. When y exceeds 0.2, the magnetic properties are rather lowered.

The Co content (z) is preferably 0.03-0.65, more preferably 0.1-0.55, particularly 0.2-0.4. When z is less than 0.03, the addition of Co fails to improve magnetic properties. Also, because unreacted $\alpha$-$Fe_2O_3$ remains in the calcined body, slurry leaks from a cavity of a molding die during wet molding. When z exceeds 0.65, undesirable phases containing much Co are formed, resulting in drastically deteriorated magnetic properties.

The molar ratio n reflects a molar ratio of (Fe+Co) to (Ca+R+Ba), being represented by $2n=(Fe+Co)/(Ca+R+Ba)$. The molar ratio n is preferably 4-7, more preferably 4-6, most preferably 4.6-5.8, particularly 4.9-5.6. When n is less than 4, there is a high percentage of a non-magnetic portion. As a result, when the oxide-type, magnetic material is a calcined body, calcined particles are too flat, resulting in drastically deteriorated HcJ. When n exceeds 7, the unreacted $\alpha$-$Fe_2O_3$ remains in the calcined body, so that the slurry leaks from a cavity of a molding die during wet molding.

When the oxide-type, magnetic material is a calcined body, it preferably contains 0.05-0.2% by mass (as $B_2O_3$) of B or 0.05-0.2% by mass (as $SiO_2$) of Si to have high magnetic properties. When the content of B or Si is less than 0.05% by mass, the magnetic properties are not improved. When it is more than 0.2% by mass, the magnetic properties are rather lowered.

(B) Composition of Sintered Ferrite Magnet and Ferrite Powder

The sintered ferrite magnet used in the present invention and its powder for bonded magnets have an M-type ferrite structure, comprise Ca, an R element that is at least one of rare earth elements and indispensably includes La, Ba, Fe and Co as indispensable elements, and have a basic composition represented by the following general formula:

$$Ca_{1-x-y}R_xBa_yFe_{2n-z}Co_z \text{ (by atomic ratio)},$$

wherein (1−x−y), x, y and z represent the contents of Ca, the R element, Ba and Co, and n represents a molar ratio, meeting
$0.3 \leq 1-x-y \leq 0.65$,
$0.2 \leq x \leq 0.65$,
$0.001 \leq y \leq 0.2$,
$0.03 \leq z \leq 0.65$,
$4 \leq n \leq 7$, and
$1-x-y > y$.

The sintered ferrite magnet used in the rotating machine of the present invention and its powder for bonded magnets are improvements over conventional sintered Ca—R—Co ferrite magnet and its particles for bonded magnets, whose M-type crystal grains are less likely to be in a hexagonal plate shape. Namely, the resultant M-type crystal grains are relatively thick with small aspect ratios, having Br and HcJ extremely close to inherent magnetic properties expected from $4\pi Is$ and $H_A$, with a small temperature dependency of HcJ (temperature coefficient β).

The Ca content (1−x−y) is 0.3-0.65, preferably 0.4-0.55. When (1−x−y) is less than 0.3, the M phase is unstable, and orthoferrite is formed by excess R elements, resulting in deteriorated magnetic properties. When (1−x−y) exceeds 0.65, the M phase disappears, and undesirable phases such as $CaFeO_{3-x}$, etc. are formed.

The R element is at least one of rare earth elements, such as La, Ce, Nd, Pr, etc., indispensably including La. To have high magnetic properties, the ratio of La in R is preferably 50 atomic % or more, further preferably 70 atomic % or more, particularly La alone (except for inevitable impurities). The R content (x) is 0.2-0.65, preferably 0.3-0.55, more preferably 0.35-0.5. When x is less than 0.2, the M phase contains an insufficient amount of Co, resulting in an unstable M-type ferrite structure. When x exceeds 0.65, more oxides of the unreacted R elements remain, generating undesirable phases such as orthoferrite, etc.

The Ba content (y) is 0.001-0.2, preferably 0.005-0.2, more preferably 0.01-0.2, most preferably 0.02-0.15, particularly 0.02-0.12. When y is less than 0.001, magnetic properties are not improved by the addition of Ba. When y exceeds 0.2, the magnetic properties are lowered.

The Co content (z) is 0.03-0.65, preferably 0.1-0.55, more preferably 0.2-0.4. When z is less than 0.03, magnetic properties are not improved by the addition of Co. When z exceeds 0.65, undesirable phases containing much Co are formed, resulting in drastically deteriorated magnetic properties.

The molar ratio n, which is the same as the molar ratio n in the above oxide-type, magnetic material, is 4-7, preferably 4-6, more preferably 4.5-5.5, most preferably 4.6-5.4. When n is less than 4, the percentage of a non-magnetic portion increases, resulting in deteriorated magnetic properties. When n exceeds 7, more unreacted $\alpha\text{-}Fe_2O_3$ remains, resulting in drastically decreased magnetic properties.

The molar ratio x/z of the R element to Co meets $0.73 \leq x/z \leq 15.62$, preferably $1 \leq x/z \leq 3$, particularly $1.2 \leq x/z \leq 2$. By selecting the composition meeting these requirements, the magnetic properties are extremely improved.

The condition of (R element content)>(Co content)>(Ba content), namely x>z>y, remarkably improves magnetic properties. Also, the condition of (Ca content)>(Ba content), namely 1−x−y>y, provides high magnetic properties.

The content (as $B_2O_3$) of B is preferably 0.05-0.2% by mass, more preferably 0.08-0.15% by mass. With this amount of B, high magnetic properties can be obtained. Less than 0.05% by mass of B fails to provide enough effect, and more than 0.2% by mass of B rather deteriorates magnetic properties.

The sintered ferrite magnet is provided with higher HcJ when 0.1-3% by mass of $Cr_2O_3$ or $Al_2O_3$ is added to the entire basic composition in a pulverizing step, followed by molding and sintering. When the amount of $Cr_2O_3$ or $Al_2O_3$ added is less than 0.1% by mass, the HcJ of the sintered ferrite magnet is not improved. When it exceeds 3% by mass, the Br of the sintered ferrite magnet is deteriorated drastically.

The above sintered ferrite magnet and its powder for bonded magnets preferably have a composition represented by the following general formula:

$$Ca_{1-x-y}R_xBa_yFe_{2n-z}Co_zO_\alpha \text{(by atomic ratio)},$$

wherein (1−x−y), x, y, z, n and α represent the contents of Ca, the R element, Ba and Co, a molar ratio, and the content of O, meeting
$0.3 \leq 1-x-y \leq 0.65$,
$0.2 \leq x \leq 0.65$,
$0.001 \leq y \leq 0.2$,
$0.03 \leq z \leq 0.65$,
$4 \leq n \leq 7$,
$1-x-y > y$, and
α=19 at a stoichiometric composition, in which x=z, and n=6.

When the R content x is equal to the Co content z, and when the molar ratio n is 6, the molar number a of oxygen is 19. The molar number of oxygen differs depending on the valences of Fe and Co, the value of n, the type of the R element, and the calcining or sintering atmosphere. The ratio of oxygen to metal elements differs depending on the lack of oxygen (vacancy) when sintered in a reducing atmosphere, the change of the valences of Fe and Co in the M-type ferrite, etc. Accordingly, the actual molar number a of oxygen may be deviated from 19.

[2] Production Method
(1) Sintered Ferrite Magnet
(A) Production of Oxide-Type, Magnetic Material The oxide-type, magnetic material (calcined body) can be produced by a solid phase reaction method, a liquid phase method such as a coprecipitation method and a hydrothermal method, a glass precipitation method, a spray pyrolysis method, a gas phase method, or their combinations. Among them, the solid phase reaction method is preferable in practical applications. The oxide-type, magnetic material may be composed of 2 or more calcined bodies produced under different calcining conditions and/or having different compositions, which are coarsely pulverized and blended. For instance, calcined powders having compositions in which n is 4 and 7, respectively, may be mixed to provide an oxide-type, magnetic material used in the present invention. Further, recycled materials such as failed green bodies, failed sintered bodies, machining dust, etc. may be used for an oxide-type, magnetic material.

The solid phase reaction method uses as starting materials oxide powders, powders of compounds such as Ca compounds, R element compounds, Ba compounds, iron compounds and Co compounds for forming oxides by calcination, and if necessary, Sr compound powder. These starting material powders are mixed to a predetermined composition, and calcined (ferritized) to produce a calcined body usually in the form of granules or clinker.

Although the calcination is conducted practically in the air (substantially corresponding to an oxygen partial pressure of about 0.05-0.2 atm), it may be conducted in an oxygen-rich atmosphere (for instance, having an oxygen partial pressure of more than 0.2 atm and 1 atm or less), particularly in a 100%-oxygen atmosphere. The calcining temperature is preferably 1373-1623 K, more preferably 1423-1573 K. The calcining time is preferably 1 second to 10 hours, more preferably 0.1-3 hours. The calcined body is preferably composed substantially of an M phase.

The addition of 0.05-0.2 parts by mass of a boron compound or $SiO_2$ to 100 parts by mass of a mixture before calcining provides high magnetic properties. The addition of less than 0.05 parts by mass of a boron compound or $SiO_2$ is not effective. More than 0.2 parts by mass of the boron compound or $SiO_2$ rather deteriorates magnetic properties. The boron compound is preferably $H_3BO_3$, $B_2O_3$, metaborate $[Ca(BO_2)_2]$, etc.

The usable Ca compounds are carbonate, oxide, chloride, etc. of Ca.

The usable R element compounds are oxides such as $La_2O_3$, hydroxides such as $La(OH)_3$, carbonates such as $La_2(CO_3)_3\text{-}8H_2O$, and organic acid salts such as $La(CH_3CO_2)_3\text{-}1.5H_2O$ and $La_2(C_2O_4)_3\text{-}10H_2O$, etc. Particularly inexpensive oxides, hydroxides, carbonates and organic acid salts of mixed rare earth elements such as La, Nd, Pr, Ce, etc. can reduce the production cost.

The usable Ba compounds are carbonates, oxides, chlorides, etc. of Ba.

The usable iron compounds are iron oxide, iron hydroxide, iron chloride, etc. Because mill scale generated during the rolling of steel plates, etc., inexpensive iron oxides, has lower quality than that of usual-grade iron oxide for sintered ferrite magnets, it has not conventionally been used for high-performance, sintered ferrite magnets. In the production method of the present invention, however, the use of mill scale as a starting material can provide sintered ferrite magnets with magnetic properties equal to or higher than those of conventional, high-performance ones. The usable mill scale powder has a particle size of 1 μm or less [determined by observation with a scanning electron microscope (SEM)], and contains iron oxide $\geq 98\%$ by mass, $Al \leq 0.2\%$ by mass (as $Al_2O_3$), $Si \leq 0.25\%$ by mass (as $SiO_2$), $Ca \leq 0.25\%$ by mass (as $CaO$), and $Cr \leq 0.05\%$ by mass (as $Cr_2O_3$). The preferred mill scale powder has a particle size of 0.1-1 μm, and contains iron oxide $\geq 98.0\%$ by mass, $Al \leq 0.15\%$ by mass (as $Al_2O_3$), $Si \leq 0.20\%$ by mass (as $SiO_2$), $Ca \leq 0.20\%$ by mass (as $CaO$), and $Cr \leq 0.04\%$ by mass (as $Cr_2O_3$).

The usable Co compounds are preferably oxides such as CoO and $Co_3O_4$, hydroxides such as CoOOH, $Co(OH)_2$ and $Co_3O_4\text{-}m_1H_2O$ ($m_1$ is a positive number), carbonates such as $CoCO_3$, and basic carbonates such as $m_2CoCO_3\text{-}m_3Co(OH)_2\text{-}m_4H_2O$ ($m_2$, $m_3$ and $m_4$ are positive numbers.), etc.

(B) Pulverization of Calcined Body and/or Recycled Materials

The calcined body and/or the recycled materials (failed green bodies, failed sintered bodies or machining dust) are crushed with a jaw crusher, a hummer mill, etc., if necessary, and then coarsely dry-pulverized with a vibration mill, a roller mill, etc. To reduce a load in the subsequent wet or dry fine pulverization step, the coarsely pulverized powder preferably has an average particle size of 2-5 μm. The average particle size can be measured at a bulk density of 65% by an air permeation method with a Fisher sub-sieve sizer (simply F.S.S.S.). Wet or dry fine pulverization is then conducted. In the practical pulverization of a green body, crushing and coarse pulverization are preferably omitted, and wet or dry, fine pulverization is directly conducted.

After the dry, coarse pulverization, water is added to conduct wet, fine pulverization with an attritor, a ball mill, etc. To improve industrial productivity (dewatering, etc.) and magnetic properties, the finely pulverized powder preferably has an average particle size of 0.4-1.3 μm (measured at a bulk density of 65% by F.S.S.S.). Pulverization to an average particle size of less than 0.4 μm invites decrease in HcJ due to abnormal growth of crystal grains during sintering, and extremely poor dewatering during wet molding. The average particle size exceeding 1.3 μm corresponds to a high percentage of coarse crystal grains in sintered ferrite body, resulting in drastic decrease in HcJ. The average particle size of the finely pulverized powder is more preferably 0.7-1.3 μm, further preferably 0.8-1.3 μm, particularly 0.8-1.2 μm.

$SiO_2$ is added to the sintered ferrite magnet at the time of wet, fine pulverization in an amount of preferably 0.1-1.5% by mass, more preferably 0.2-1% by mass, based on the total composition. With $SiO_2$ added, high HcJ can be obtained stably. Less than 0.1% by mass of $SiO_2$ does not provide sufficient effect. When the amount of $SiO_2$ exceeds 1.5% by mass, there is too much grain-growth-suppressing effect, resulting in decrease in Br.

$CaCO_3$ is added to the sintered ferrite magnet at the time of wet, fine pulverization in an amount of preferably 0.2-1.5% by mass, more preferably 0.3-1.3% by mass, based on the total composition. With $CaCO_3$ added, the growth of M-type ferrite grains is accelerated during sintering, resulting in improved Br. Less than 0.2% by mass of $CaCO_3$ does not provide sufficient effect. When the amount of $CaCO_3$ exceeds 1.5% by mass, excessive grain growth occurs during sintering, resulting in drastic decrease in HcJ.

The addition of 0.05-10 parts by mass of iron oxide per 100 parts by mass of the calcined powder and/or the recycled material powder (failed green bodies, failed sintered bodies or machining dust) during wet, fine pulverization can adjust the molar ratio n of the sintered ferrite magnet without deteriorating magnetic properties.

After the wet, fine pulverization, the slurry is concentrated if necessary, and then molded. The concentration treatment is conducted by centrifugal separation, filter-pressing, etc.

(C) Molding

The molding may be conducted in a dry or wet state. Compression molding without a magnetic field provides green bodies for isotropic, sintered ferrite magnets. Compression molding in a magnetic field provides green bodies for anisotropic, sintered ferrite magnets having high magnetic properties. To provide green bodies with higher orientation, wet molding in a magnetic field is more suitable than dry molding in a magnetic field.

The wet molding method comprises molding slurry in a magnetic field. The molding pressure is about 0.1-0.5 ton/$cm^2$, and the magnetic field applied is preferably about 398-1194 kA/m.

The dry molding is conducted by (a) a method of molding dry powder obtained by drying slurry at room temperature or at a high temperature (about 323-373 K), and disintegrating it by an atomizer, etc., (b) a method of molding slurry in a magnetic field, crushing the resultant green body by a crusher, etc., classifying the resultant magnetically oriented granules to an average particle size of about 100-700 μm, and dry-molding the granules in a magnetic field, (c) a method of forming fine powder by dry coarse pulverization and dry fine pulverization, and dry-molding the fine powder with or without a magnetic field, etc. The dry-molding pressure is preferably about 0.1-0.5 ton/$cm^2$, and the magnetic field applied is preferably about 398-1194 kA/m.

The recycling of powder composed of at least one of failed green bodies, failed sintered bodies and machining dust as a moldable material contributes to cost reduction and environmental protection. The failed green bodies include broken green bodies, cracked green bodies, irregularly sized green bodies, etc. The failed sintered bodies include irregularly sized sintered bodies, sintered bodies with unsatisfactory magnetic properties, broken sintered bodies, cracked sintered bodies, etc. The machining dust includes shards generated by cutting sintered bodies, chips and powder generated by cutting or grinding sintered bodies, etc. Because the cut chips and ground dust contain foreign matter such as grinder grains and an oil component, etc., they are preferably calcined. Although the moldable material may be composed of 100% recycled materials such as failed green bodies, failed sintered bodies and machining dust, etc., it is preferable to use both recycled materials and calcined powder other than the recycled materials. Though not particularly restricted, their mixing ratio is preferably 5-95 parts by mass/95-5 parts by mass.

(D) Sintering

The green body is dried spontaneously or by heating at 373-773 K in the air or in a nitrogen atmosphere to remove water, a dispersant, etc., and then sintered. It is practical to conduct sintering in the air (oxygen partial pressure: about 0.05-0.2 atm). The sintering may be conducted in an oxygen-rich atmosphere having an oxygen partial pressure of, for instance, more than 0.2 atm and 1 atm or less, particularly in a 100%-oxygen atmosphere. The sintering is conducted at a temperature of 1423-1573 K, preferably 1433-1543 K, for 0.5-5 hours, preferably 1-3 hours. The sintered ferrite magnet used in the present invention preferably has a density of 5.05-5.10 g/cm$^3$.

(2) Bonded Magnet

Ferrite powder for the bonded magnet is preferably composed of planar particles having high aspect ratios (maximum diameter/thickness) to increase its filling ratio in the compound. The aspect ratios of the particles are preferably 1-10, more preferably 1.5-5, most preferably 1.5-3. The aspect ratios outside the range of 1-10 do not increase the filling ratio of the magnetic powder, failing to achieve high Br. The thickness of the particles is preferably 0.1-5 μm, more preferably 0.2-4 μm, further preferably 0.2-3 μm. The aspect ratio (maximum diameter of c-plane)/(thickness in c-axis direction) of each particle is determined on a SEM photograph.

(A) Production of Oxide-Type, Magnetic Material

An oxide-type, magnetic material for ferrite powder for bonded magnets can be produced by the same method as for producing the sintered ferrite magnet. In the case of solid phase reaction method, it is preferable to add a flux at the time of calcining to obtain high-aspect-ratio calcined particles. Because its production method is the same as that of the oxide-type, magnetic material for the sintered ferrite magnet except for the addition of a flux, its explanation will be omitted.

With a flux added at the time of calcining, particle shapes can be controlled to provide high-aspect-ratio particles. The flux is preferably at least one selected from the group consisting of chlorides such as $SrCl_2 \cdot 2H_2O$, $CaCl_2 \cdot 2H_2O$, $MgCl_2$, KCl, NaCl and $BaCl_2 \cdot 2H_2O$, and condensed borates containing a Ia or IIa element in the Periodic Table such as $NaBO_2 \cdot 4H_2O$ and $Na_2B_4O_7$. The amount of a flux is preferably 0.5-10 parts by mass, more preferably 1-8 parts by mass, further preferably 1.5-5 parts by mass, per 100 parts by mass of the mixture. When the amount of a flux added is less than 0.5 parts by mass, ferrite particles do not have sufficiently planar shapes. When the amount of a flux added is more than 10 parts by mass, a high percentage of non-magnetic phases appear, resulting in drastically reduced Br.

(B) Pulverization of Calcined Body

Because the calcined body is pulverized in the same manner as in the sintered ferrite magnet, its specific explanation will be omitted.

Finely pulverized powder used for ferrite powder for bonded magnets has an average particle size (measured at a bulk density of 65% according to F.S.S.S.) of preferably 0.9-3 μm, more preferably 0.9-2 μm, further preferably 1-2 μm. When the average particle size of the finely pulverized powder is less than 0.9 μm, the resultant bonded magnet has drastically low density and Br. When it is more than 3 μm, the bonded magnet has low HcJ.

When the flux is added at the time of calcining, the slurry after wet, fine pulverization is washed with water to remove the flux. In the case of dry fine pulverization, the resultant fine powder is washed with water to remove the flux, and then dried to obtain fine powder. The slurry after wet, fine pulverization may be washed with water, dried, and then lightly and finely dry-pulverized. By dry fine pulverization (by a ball mill, etc.), projections of the calcined particles are worn off, improving their orientation, a particle size distribution of the resultant fine powder is expanded, resulting in higher fillability (compression density).

(C) Heat Treatment

A heat treatment in the air (corresponding to an oxygen partial pressure of about 0.05-0.2 atm) provides the finely pulverized powder with improved HcJ. HcJ is more improved by a heat treatment in an atmosphere having an oxygen partial pressure of more than 0.2 atm and 1 atm or less, particularly having a 100-% oxygen concentration. When the M-type structure is stable, even a heat treatment in an oxygen-poor atmosphere such as a nitrogen gas atmosphere having an oxygen partial pressure of less than 0.05 atm is effective. A heat treatment temperature is preferably 973-1273 K, more preferably 973-1243 K, further preferably 973-1223 K. When the temperature is lower than 973 K, HcJ is not sufficiently improved. When it exceeds 1273 K, the aggregation of ferrite particles occurs to a large extent, drastically reducing the Br and HcJ of the bonded magnet. A temperature-keeping time is preferably 0.1-10 hours, more preferably 1-5 hours. When it is shorter than 0.1 hour, HcJ is improved insufficiently. When it is longer than 10 hours, a further effect cannot be obtained.

To remove aggregation, the heat-treated ferrite powder is preferably immersed in water, dried, and disintegrated by a mixer, etc., if necessary.

The heat-treated ferrite powder is substantially composed of an M phase (having an M-type ferrite structure), and has an average particle size (F.S.S.S.) of preferably 0.9-3 μm, more preferably 0.9-2 μm, further preferably 1-2 μm, and an aspect ratio of preferably 1-10, more preferably 1.5-5, further preferably 1.5-3. Such aspect ratio provides high orientation, enabling the blending of a compound at a high filling ratio. The aspect ratio of the heat-treated ferrite particles can be measured in the same manner as in the calcined particles.

After adding 0.2-0.6% by mass (as $Bi_2O_3$) of a Bi compound to the fine ferrite powder, the heat treatment is conducted to obtain high Br and HcJ. The Bi compound increases the thickness of a heat-treated ferrite particle in a c-axis direction, providing it with a round shape. Round particles are well dispensed in a binder, resulting in improved fillability and orientation. When the amount of the Bi compound added is less than 0.2% by mass, enough effect cannot be obtained. When it exceeds 0.6% by mass, Br, etc. are reduced.

(D) Production of Compound and Bonded Magnet

The ferrite powder is surface-treated and blended with a binder to produce a compound. The surface treatment, which may be omitted, is conducted by adding 0.1-1% by mass of a surface-treating agent such as a silane coupling agent or a titanate coupling agent, etc. to the ferrite powder. Heating may be conducted at a temperature of 343-423 K for 0.5-5 hours in the air, if necessary. The surface treatment improves the strength and/or Br of the bonded magnet.

Blending is conducted preferably between 85-95 parts by mass of ferrite powder and 15-5 parts by mass of a binder, more preferably between 90-95 parts by mass of ferrite powder and 10-5 parts by mass of a binder, further preferably between 91-94 parts by mass of ferrite powder and 9-6 parts by mass of a binder. The binders are preferably thermoplastic resins, thermosetting resins, rubbers, etc. When the thermosetting resins are used, the molding is heat-cured. Metals having lower melting points than the Curie temperature of the ferrite powder or their alloys may also be used as binders. When the percentage of the ferrite powder is less than 85% by mass, high Br cannot be obtained. When it exceeds 95% by mass, the dispersibility and filling uniformity of the ferrite powder in the compound are drastically reduced, so that large numbers of fine pores are generated in the molding, resulting in bonded magnets with drastically reduced density, Br and maximum energy product (BH) max. It is preferable to add a dispersant for magnetic powder such as phenol compounds, a lubricant such as wax or a silicone oil, a plasticizer such as DOP or DBP, etc. to the compound. The total amount of these additives is preferably 3% or less by mass, more preferably 1-2% by mass, per the total amount of the compound.

The above compound is molded by a proper method to obtain the bonded magnet of the present invention. The molding becomes anisotropic or isotropic depending on the existence and absence of an orienting magnetic field and/or mechanical stress. A practically useful molding is injection molding, compression molding or extrusion molding.

(E) Production of Magnet Roll

The bonded magnet of the present invention is preferably used for magnet rolls. In the magnet roll of the present invention, at least one magnetic pole [for instance, pole S1 in FIG. 9(c)] is preferably constituted by the bonded magnet of the present invention. The bonded magnet practically has radial or polar anisotropy. The magnet roll may be an integrally bonded magnet, or may comprise bonded magnets which are adhered.

Figure 16:
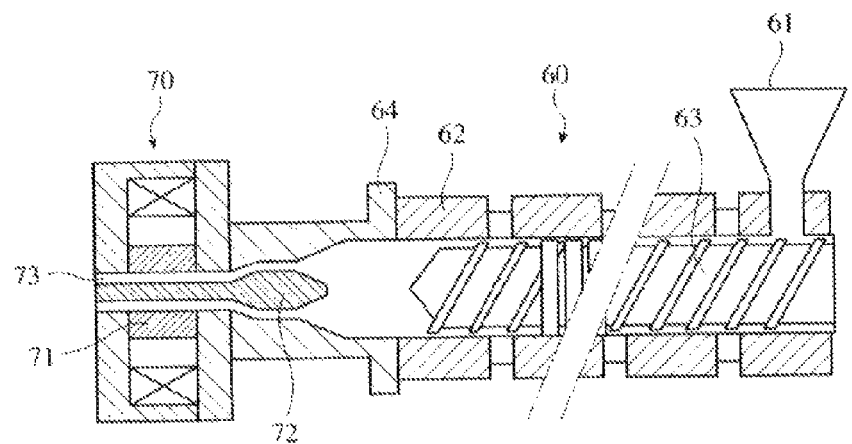
FIG. 16 is a cross-sectional view showing an apparatus for molding a bonded magnet for a magnet roll.
Figure 17:
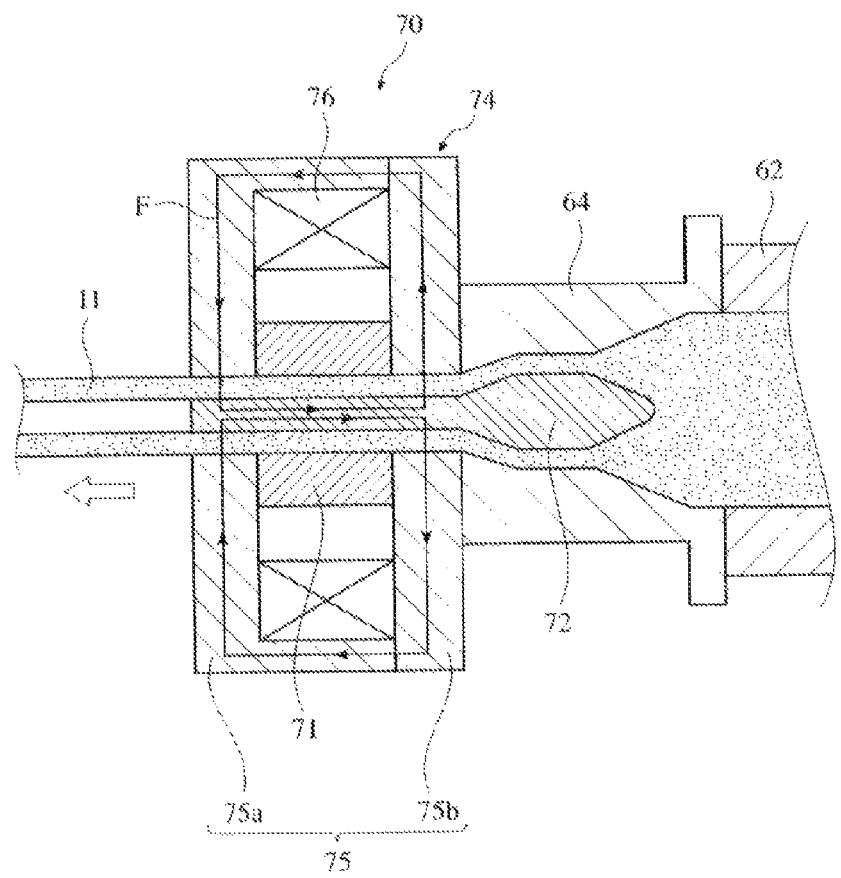
FIG. 17 is a cross-sectional view showing an example of the structure of an orienting die in the molding apparatus of FIG. 16.

Referring to FIGS. 16 and 17, an apparatus for producing an integral, cylindrical, bonded magnet having radial anisotropy for a magnet roll will be explained. FIG. 16 shows the overall structure of the molding apparatus, and FIG. 17 shows in detail an important portion (orienting die 70) of the molding apparatus of FIG. 16. A double-screw extruder 60 constituting the molding apparatus comprises a divided barrel 62 equipped with a hopper 61 at one end, two screws 63 (only one is shown in the figure) disposed inside the barrel 62, and an adaptor 64 disposed at a tip end of the barrel 62. An exit opening of the adaptor 64 is connected to an orienting die 70, which comprises a ring-shaped spacer 71, a mandrel 72, a cylindrical molding space 73 located therebetween, and a magnetic-field-generating member 74 arranged around the ring-shaped spacer 71.

The magnetic-field-generating member 74 comprises pluralities of coils 76 surrounding the molding space 73, which are positioned at a predetermined interval inside a cylindrical yoke 75 (comprising a first yoke 75a and a second yoke 75b) made of a ferromagnetic material. A magnetic flux F flows in the yoke 75 as shown in the figure.

Using the extruder 60, a radially anisotropic, bonded magnet is produced as follows. A moldable material (for instance, a compound containing an ethylene copolymer resin as a binder) introduced into the barrel 62 via the hopper 61 is conveyed to the orienting die 70, while being sheared by the rotation of a pair of screws 63, and heated at a temperature of 423-503 K to melt the binder in the moldable material. While receiving a magnetic field in the orienting die 70, the moldable material passes through the molding space having a smaller cross section. The orienting magnetic field is preferably 159-478 kA/m. Molding in a magnetic field of such intensity with radial or polar anisotropy produces a radial- or polar-anisotropic, bonded magnet having high magnetic properties. When the orienting magnetic field is less than 159 kA/m, useful anisotropy cannot be provided. When it is more than 478 kA/m, little improvement is obtained.

Figure 9A:
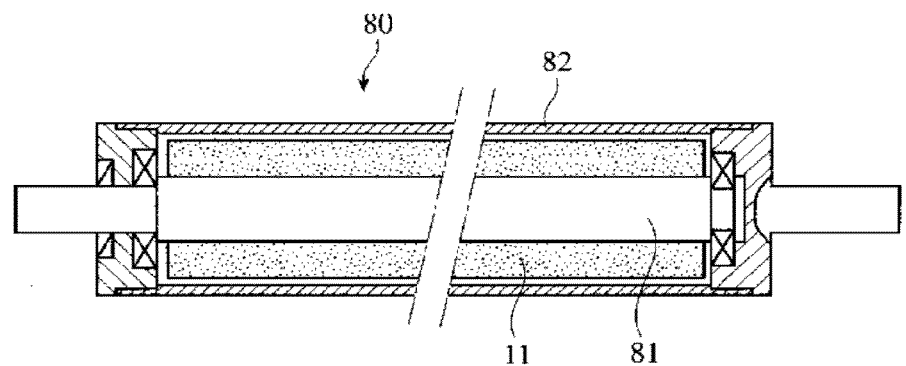
FIG. 9(a) is a longitudinal cross-sectional view showing a magnet roll having the cylindrical bonded magnet.
Figure 9B:
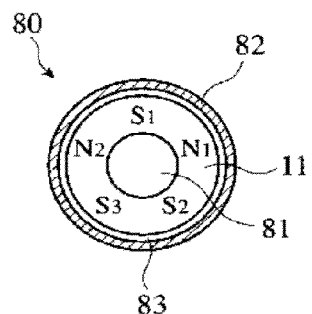
FIG. 9(b) is a transverse cross-sectional view showing the magnet roll of FIG. 9(a).
Figure 9C:
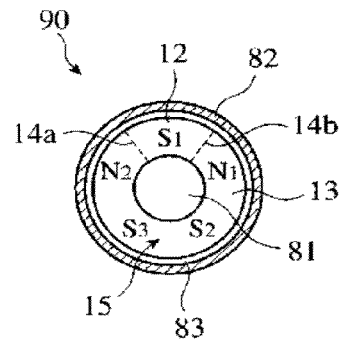
FIG. 9(c) is a transverse cross-sectional view showing a magnet roll comprising a cylindrical bonded magnet, in which the bonded magnet of the present invention is adhered to a conventional bonded magnet.

A radial-anisotropic molding 11 extruded from the die is cut to a predetermined length meeting L/D≧5, wherein L is the length of the cut extrudate, and D is the diameter of the extrudate, solidified by cooling, and demagnetized. As shown in FIGS. 9(a) and 9(b), a shaft 81 is fixed to a center hole of the molding 11, and the molding 11 is assembled in a sleeve 82 with an air gap 83 to produce a magnet roll 80. The magnet roll 80 is used in a copier, etc., in which a pole S1 of the stationary molding 11 acts as a developing pole, and the sleeve 82 is rotated to convey a developer (not shown).

The magnet roll of the present invention is not restricted to have an integral, cylindrical (hollow), bonded magnet as described above. At least one magnetic pole portion is preferably constituted by the bonded magnet of the present invention. In the magnet roll 90 shown in FIG. 9(c), for instance, a cylindrical bonded magnet 15 assembled in a sleeve 82 with an air gap 83 has a structure comprising a conventional, polar-anisotropic, bonded Sr ferrite magnet 13 having a C-shaped cross section, and the radially anisotropic, bonded magnet 12 of the present invention having an arc segment cross section, which are adhered to each other at surfaces 14a, 14b. Because a developing pole S1 is made by the bonded magnet of the present invention in this structure, a higher-performance magnet roll 90 than conventional ones can be obtained.

As a further example, a long, anisotropic, bonded magnet of the present invention may be adhered to a longitudinal groove on a surface of a hollow, cylindrical, permanent magnet (for instance, conventional, isotropic, sintered or bonded ferrite magnet) for a magnet roll, to constitute a developing pole of the magnet roll.

[3] Properties (1) Sintered Ferrite Magnet

The average crystal grain size measured on 50 M-type crystal grains in the anisotropic, sintered ferrite magnet used in the present invention in a cross section parallel with their c-axis directions by SEM observation is preferably 0.5-3 µm, more preferably 0.9-2 µm, further preferably 1.0-1.6 µm. The sintered ferrite magnet used in the present invention has high HcJ and low β even at an average crystal grain size of 1 µm or more. The c-axis direction of the sintered ferrite magnet means an anisotropy-providing direction (substantially equal to the direction of applying a magnetic field in molding).

To have high Br and HcJ, the percentage of the M-type crystal grains having aspect ratios (grain size/thickness) of 3 or less in the sintered ferrite magnet used in the present invention is 30% or more, preferably 50% or more, further preferably 60% or more.

The sintered ferrite magnet used in the present invention preferably has a temperature coefficient β (%/K) of intrinsic coercivity HcJ between 233 K and 413 K meeting the formula of $0<\beta\leq-0.0009\times HcJ_{293}+0.445$, wherein $HcJ_{293}$ is intrinsic coercivity (kA/m) at 293 K], and the air-sintered product has Br of 400-470 mT, HcJ of 264-478 kA/m and a squareness ratio (Hk/HcJ) of 80% or more at room temperature (20° C.). It preferably has Br of 420-470 mT, HcJ of 264-478 kA/m and a squareness ratio (Hk/HcJ) of 80% or more, particularly Br of 450-470 mT, HcJ of 264-478 kA/m and a squareness ratio (Hk/HcJ) of 80% or more. A parameter Hk used to determine the squareness ratio (Hk/HcJ) is read on an H-axis at a position at which 4πI is 0.95 Br, in the second quadrant of a curve expressing the relation between 4πI (intensity of magnetization) and H (intensity of magnetic field).

Though not restricted, the sintered ferrite magnets practically highly useful for rotating machines are arc segment magnets having parallel, radial or polar anisotropy, or ring magnets having polar anisotropy including radial-two-polar anisotropy. The ring magnet preferably has an outer diameter of 8-70 mm, an inner diameter/outer diameter ratio of 0.2-0.5 and a longitudinal length of 5-100 mm, with 2-48 magnetic poles longitudinally on an outer or inner surface. The rotating machine of the present invention has preferably 2-48 magnetic poles for practical applications, more preferably 2-24 magnetic poles, along the air gap (magnetic gap) of the rotating machine.

The rotating machine of the present invention is suitable for motors for starters, power steering, electrically controlled throttles, etc. in automobiles, or generators. Also, the sintered ferrite magnets are suitable for developing magnet rolls in copiers.

(2) Bonded Magnet

The anisotropic, bonded magnet of the present invention has Br of 280 mT or more and HcJ of 159 kA/m or more, preferably Br of 280-310 mT and HcJ of 159-398 kA/m, further preferably Br of 290-310 mT and HcJ of 198-398 kA/m, at room temperature (20° C.). Accordingly, the anisotropic, bonded magnet of the present invention is particularly suitable for high-Br applications. For instance, it exhibits higher performance than those of conventional bonded magnets of the same size. Even if it has a smaller size, it has similar performance to those of conventional products. Particularly a hollow, cylindrical, bonded magnet having an outer diameter D of 10-60 mm and a longitudinal length L of 200-350 mm, with $L/D \geq 5$, is practically useful for magnet rolls. When used for small copiers or printers, a small-diameter, cylindrical, bonded magnet having D of 10-30 mm, particularly 10-20 mm, $L/D \geq 5$, is preferable.

The present invention will be explained in more detail referring to Examples below without intention of restricting the scope of the present invention.

Example 1

Magnetic Properties and Temperature Coefficient β of HcJ of Radial-Two-Pole, Anisotropic, Sintered Ferrite Ring Magnet at Room Temperature $CaCO_3$ powder (purity: 98.8%, containing MgO as an impurity), $La(OH)_3$ powder (purity: 99.9%), $BaCO_3$ powder (purity: 98.1%, containing 1.45% of $SrCO_3$ as an impurity), $\alpha$-$Fe_2O_3$ powder (industrial grade), and $Co_3O_4$ powder (purity: 99%) were mixed to provide a composition of $Ca_{1-x-y}La_xBa_yFe_{2n-z}Co_zO_{19}$, wherein x was 0.475, y was 0.050, z was 0.30, and n was 5.2. 100 parts by mass of this composition was wet-blended with 0.1 parts by mass of $H_3BO_3$ powder, dried, and calcined at 1473 K for 1 hour in the air.

The resultant calcined body was subjected to coarse pulverization, and then to dry coarse pulverization by a vibration mill to obtain coarse powder having an average particle size of 5 μm (according to F.S.S.S.). After 45% by mass of the coarse powder and 55% by mass of water were charged into a ball mill, 0.40 parts by mass of $SiO_2$ powder (purity: 92.1%, the balance being substantially water) and 0.50 parts by mass of $CaCO_3$ powder were added as sintering aids to 100 parts by mass of the coarse powder. The resultant mixture was subjected to wet, fine pulverization to form slurry containing fine ferrite particles having an average particle size of 0.9 μm (according to F.S.S.S.).

Figure 10A:
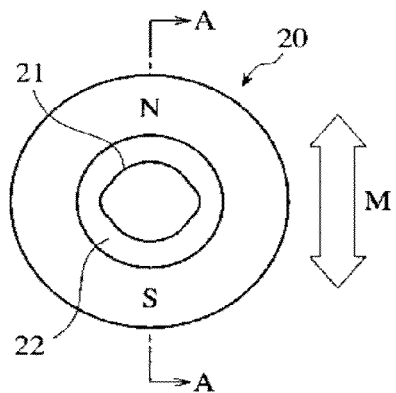
FIG. 10(a) is a plan view showing a ring magnet used in the present invention.
Figure 10B:
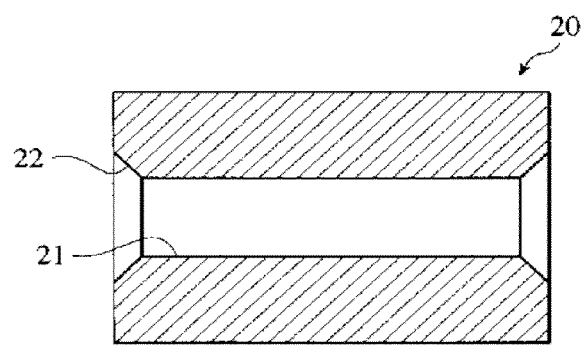
FIG. 10(b) is a cross-sectional view taken along the line A-A in FIG. 10(a).

The slurry after fine pulverization was charged into a ring-shaped cavity of a molding die, to which a parallel magnetic field of 796 kA/m was applied substantially diametrically, and compression-molded at a pressure of 0.4 ton/cm² in a magnetic field. The resultant ring-shaped green body (density: 2.87 g/cm³) with radial-two-polar anisotropy was sintered at a temperature of 1493 K for 1 hour in the air. The sintered body was machined to a radial-two-pole, anisotropic, sintered ferrite ring magnet 20 of 19 mm in outer diameter and 6 mm in inner diameter in the orientation direction M and 30 mm in x-direction length shown in FIG. 10. The ring magnet 20 had an unmachined inner surface 21, which was elliptical by orientation. A recess 22 is a portion for holding an adhesive for bonding the ring magnet 20 to a member (not shown) such as a rotating machine shaft.

The measurement of magnetic properties at room temperature (293 K) in the direction of anisotropy with a B—H tracer revealed that the ring magnet 20 had as high Br as 460 mT, as high HcJ as 354 kA/m, and as high Hk/HcJ as 87%. Measurement by VSM between 233 K and 413 K revealed that a sample of 3 mm×3 mm×3 mm cut out of the ring magnet 20 had as extremely small a temperature coefficient β of HcJ as 0.114%/K. The values of β are expressed by the mark of square in FIG. 12. The temperature coefficient β was determined from the values of HcJ measured by VSM at 233 K, 253 K, 293 K, 333 K, 373 K and 413 K, respectively, by approximating the relation between the measurement temperature and the HcJ to a straight line by a least squares method, and dividing its inclination by the value of HcJ at room temperature (293 K).

Conventional Example 1

Magnetic Properties of Radial-Two-Pole, Anisotropic, Sintered Ferrite Ring Magnet at Room Temperature The experiment of Sample 2 in Japanese Patent 3181559 was traced. A composition of $Ca_{1-x-y}La_xBa_yFe_{2n-z}Co_zO_{19}$, wherein x was 0.500, y was 0, z was 0.43, and n was 5.1, was mixed with 0.4% by mass of $SiO_2$, and the resultant mixture was calcined at 1473 K for 3 hours in the air. After crushing and coarse pulverization of the calcined body, 100% by mass of the resultant coarse powder was mixed with 0.6% by mass of $SiO_2$ and 1.0% by mass of $CaCO_3$, and subjected to wet, fine pulverization in a ball mill with water as a medium to form slurry, in which fine powder having an average particle size of 0.9 μm was dispersed. Because the average particle size of fine powder in Sample 2 of Japanese Patent 3181559 is not described, it was assumed to be the same as 0.9 μm of the finely pulverized powder of Example 1.

This slurry was subsequently molded in a magnetic field in the same manner as in Example 1, to obtain a radial-two-pole, ring-shaped green body (density: 2.71 g/cm³). This green body was sintered and machined to a radial-two-pole, anisotropic, sintered ferrite ring magnet having the same shape as in Example 1. The magnetic properties of this ring magnet at room temperature (293 K) in an anisotropy-providing direction were as low Br as 430 mT, as low HcJ as 320 kA/m, and as low Hk/HcJ as less than 50%.

Each ring magnet obtained in Example 1 and Conventional Example 1 was assembled as a field magnet in a rotor to constitute an inner-rotor-type motor. The measurement of these two types of motors at 233 K revealed that the motor comprising the ring magnet of Example 1 was about 2% more efficient than the motor comprising the ring magnet of Conventional Example 1. It was thus found that the ring magnet of Example 1 suffered less low-temperature demagnetization that that of Conventional Example 1.

The analyzed compositions of the ring magnets (sintered bodies) of Example 1 and of Conventional Example 1 are shown in Tables 1 and 2.

TABLE 1

| | | Composition of Sintered Body $Ca_{1-x-y}La_xBa_yFe_{2n-z}Co_zO_{19}$ | | | | |
|---|---|---|---|---|---|---|
| No. | Molar Ratio n | Ca $1-x-y$ | La X | Ba y | Fe $2n-z$ | Co z |
| Example 1 | 4.958 | 0.499 | 0.453 | 0.048 | 9.630 | 0.286 |
| Conventional Example 1 | 4.652 | 0.544 | 0.456 | 0.000 | 8.911 | 0.392 |

TABLE 2

| | Analyzed Composition of Sintered Body (atomic %) | |
|---|---|---|
| Elements | Example 1 | Conventional Example 1 |
| Ca | 4.440 | 5.085 |
| La | 4.121 | 4.367 |
| Ba | 0.425 | 0.000 |
| Sr | 0.008 | 0.000 |
| Fe | 87.084 | 84.804 |
| Co | 2.602 | 3.755 |
| Si | 0.546 | 1.354 |
| B | 0.142 | 0.000 |
| Cr | 0.018 | 0.017 |
| Al | 0.089 | 0.087 |
| Mn | 0.412 | 0.401 |
| Ni | 0.001 | 0.001 |
| Mg | 0.112 | 0.129 |

Structure of Calcined Body

FIG. 1 is a SEM photograph of a fractured surface of the calcined body (x=0.475, y=0.050, z=0.30, and n=5.2) of Example 1. There were many hexagonal-plate-like, primary particles (M-type crystal grains), indicating that the M-type crystal grains had a high growing rate. This SEM photograph indicates that the crystal grains had a maximum diameter of about 3-9 μm in a c plane, a thickness of about 1.3-4.3 μm, and an aspect ratio (maximum diameter/thickness) of about 1.5-4.2.

Figure 2:
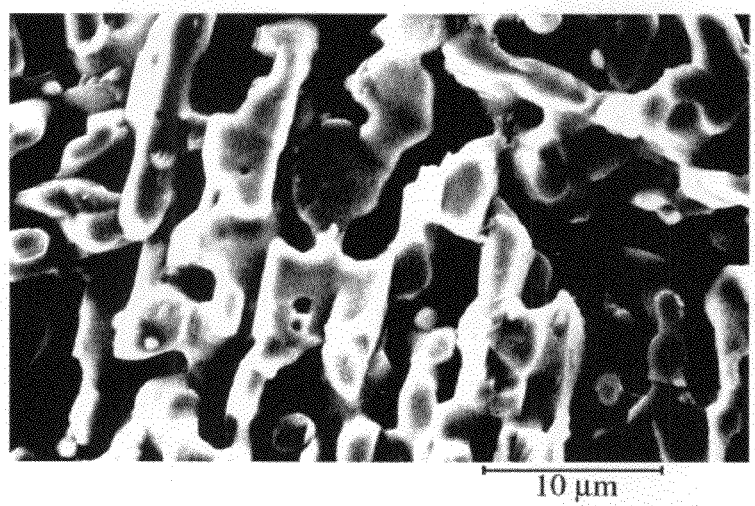
FIG. 2 is a SEM photograph showing a fractured surface of the calcined body of Conventional Example 1.

FIG. 2 is a SEM photograph of a fractured surface of the calcined body of Conventional Example 1 (x=0.500, y=0, z=0.43, and n=5.1). Primary particles were in irregular shapes, without hexagonal-plate-like ones.

It is clear from the comparison of FIGS. 1 and 2 that primary particles in the calcined body of Example 1 containing a predetermined amount of Ba were in a thick, hexagonal-plate-like shape. About 60% of primary particles in the calcined body of Example 1 had aspect ratios of 5 or less.

Structure of Finely Pulverized Powder

Figure 3:
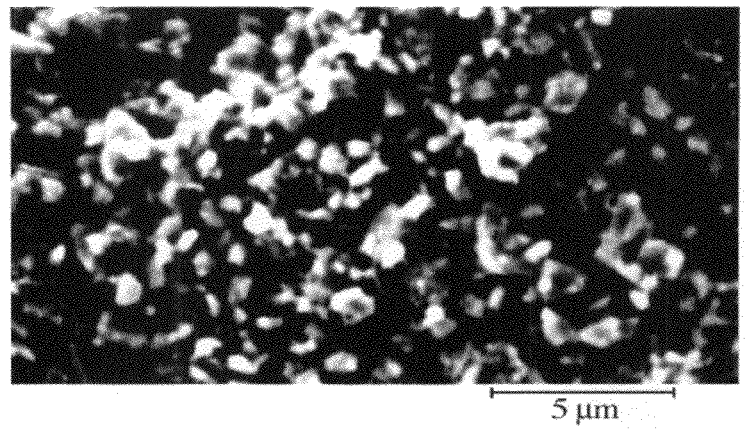
FIG. 3 is a SEM photograph showing finely pulverized powder of the calcined body of Example 1 of the present invention.

FIG. 3 is a SEM photograph of fine powder (average particle size: 0.9 μm) obtained by drying slurry of the finely pulverized, calcined body of Example 1 (x=0.475, y=0.050, z=0.30, and n=5.2). It was observed that there were many hexagonal-plate-like particles, and that there were many particles having a maximum diameter of 0.4-1.2 μm, with few ultra-fine particles having a maximum diameter of less than 0.4 μm and few coarse particles having a maximum diameter of more than 1.2 μm.

Figure 4:
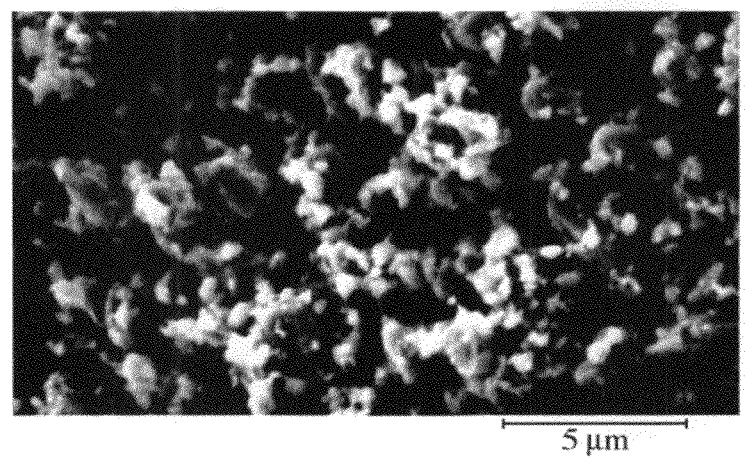
FIG. 4 is a SEM photograph showing finely pulverized powder of the calcined body of Conventional Example 1.

FIG. 4 is a SEM photograph of fine powder (average particle size 0.9 μm) obtained by drying slurry of the finely pulverized, calcined body of Conventional Example 1 (x=0.500, y=0, z=0.43, and n=5.1). It was observed that particles were in irregular shapes, with many ultra-fine particles having a maximum diameter of 0.2 μm or less and many coarse particles having a maximum diameter of 1.5 μm or more.

It is clear from FIGS. 3 and 4 that the difference in a green body density between Example 1 and Conventional Example 1 was derived from their difference in powder properties.

Structure of Sintered Body

Figure 5:
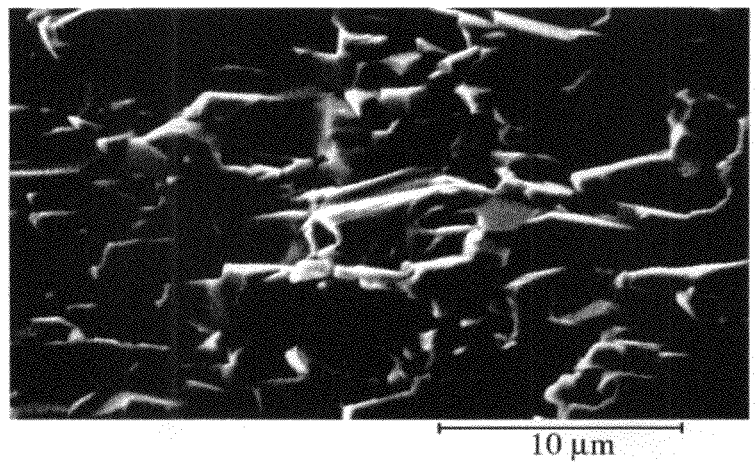
FIG. 5 is a SEM photograph showing a fractured surface of the sintered ferrite magnet of Example 1 of the present invention.

FIG. 5 is a SEM photograph of a fractured surface (plane a) of the sintered body of Example 1. Hexagonal-plate-like particles (M-type crystal grains) were thick, and had aspect ratios of about 1.5-3.5, about 60% of them having aspect ratios of 3 or less. Their average crystal grain size in a c-axis direction was 1.1 μm.

Figure 6:
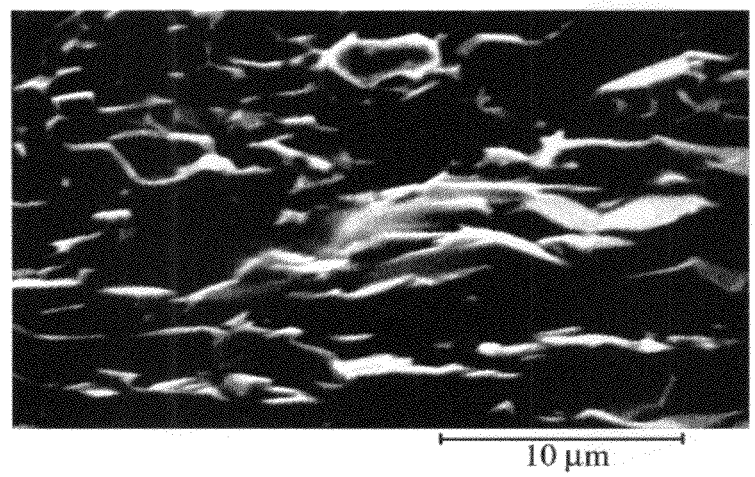
FIG. 6 is a SEM photograph showing a fractured surface of the sintered ferrite magnet of Conventional Example 1.

FIG. 6 is a SEM photograph of a fractured surface of the sintered body of Conventional Example 1. Many particles having aspect ratios of about 3-6 were observed.

The sintered ferrite magnet of Example 1 contained a particular amount of Ba, and had substantially well-grown, hexagonal-plate-like, M-type ferrite crystal grains as shown in FIGS. 1, 3 and 5. On the other hand, Conventional Example 1 had a lower growing rate of M-type ferrite crystal grains than that of Example 1, and contained many M-type ferrite crystal grains, which were not in the form of a hexagonal plate, as shown in FIGS. 2, 4 and 6. Such microstructural difference leads to the difference between the sintered ferrite magnets of Example 1 and Conventional Example 1 in magnetic properties.

Example 2

Magnetic Properties and Temperature Coefficient β of HcJ of Anisotropic, Sintered, Arc-Segment Ferrite Magnet at Room Temperature The same $CaCO_3$ powder, $La(OH)_3$ powder, $BaCO_3$ powder, $\alpha$-$Fe_2O_3$ powder and $Co_3O_4$ powder as in Example 1 were blended to a composition of $Ca_{0.5-y}La_{0.5}Ba_yFe_{2n-z}Co_zO_{19}$ (y=0.025, z=0.3, and n=5.3). 100 parts by mass of this blend was wet-mixed with 0.1 parts by mass of $H_3BO_3$ powder, dried, and calcined at 1473 K for 1 hour in the air.

The calcined body was substantially in the same structure as in FIG. 1. This calcined body was crushed, and coarsely dry-pulverized by a vibration mill. 45% by mass of the resultant coarse powder and 55% by mass of water were charged into a ball mill, and 0.35 parts by mass of $SiO_2$ powder and 0.5 parts by mass of $CaCO_3$ powder were added as sintering aids to 100 parts by mass of the coarse powder, and wet, fine pulverization was conducted to form slurry containing fine ferrite particles having an average particle size of 0.8 μm (according to F.S.S.S.).

The slurry after fine pulverization was compression-molded at a pressure of 0.4 ton/cm² in a radially orienting magnetic field of 796 kA/m, to obtain a radially oriented, arc-segment, green body (density: 2.81 g/cm³). The green body was sintered at a temperature of 1473 K, 1493 K and 1508 K, respectively, for 1 hour in the air, and machined to an outer diameter of 26.5 mm, an inner diameter of 21 mm, an x-direction length of 45 mm and an arc angle (center angle) of 150° to obtain a radially anisotropic, sintered, arc-segment ferrite magnet.

Figure 12:
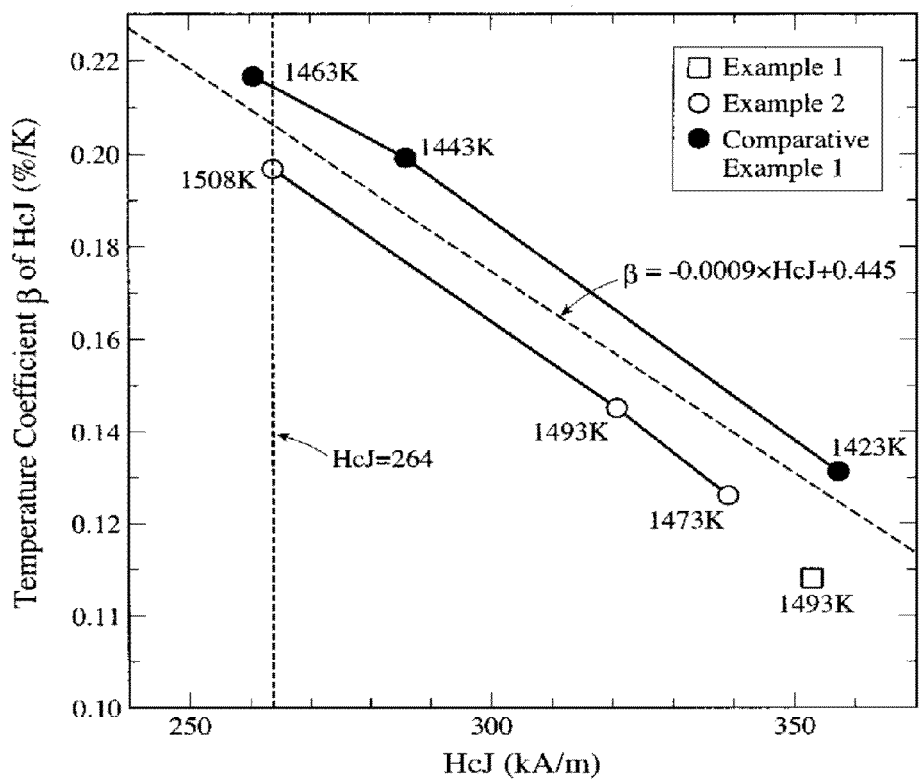
FIG. 12 is a graph showing the relation between HcJ and its temperature coefficient β in the sintered ferrite magnets of Examples 1, 2 and Comparative Example 1, in which sintering temperatures and the equation of an auxiliary line (broken line) are described.
Figure 13:
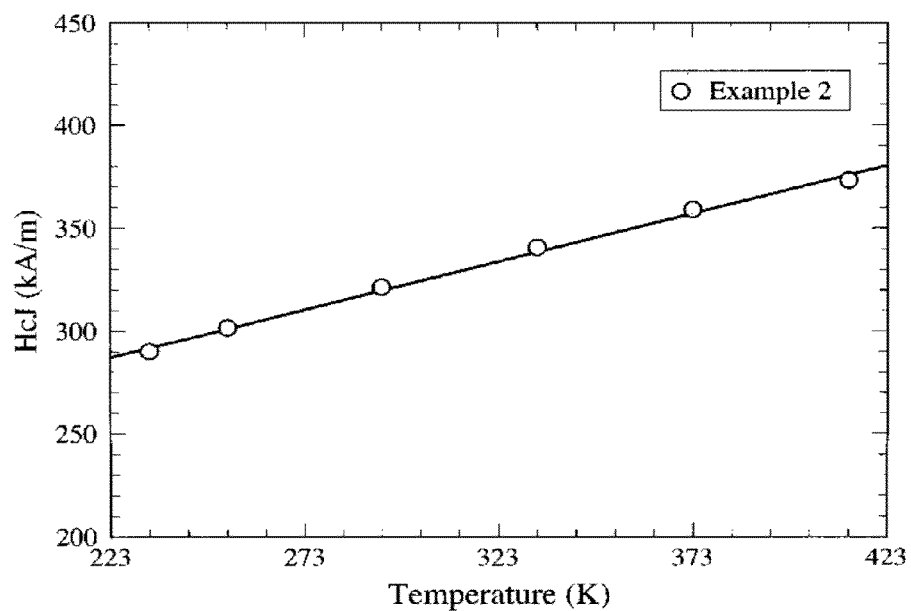
FIG. 13 is a graph showing the relation between the measurement temperature of the sintered ferrite magnet of Example 2 (sintered at 1493 K) and its HcJ.

The magnetic properties of this arc-segment ferrite magnet measured at room temperature (293 K) by a B—H tracer as in Example 1 are shown in Table 3. The temperature coefficient β of HcJ of the arc-segment magnet measured between 233 K and 413 K as in Example 1 is shown in FIG. 12. FIG. 13 is a graph showing the relation between HcJ and a measurement temperature, which was approximated to a straight line by a least squares method, with respect to the magnet of Example 2 sintered at 1493 K. β was determined by dividing the inclination of this straight line by the value of HcJ at room temperature (293 K). Measurement revealed that this arc-segment magnet had 4πIs of 496 mT and $H_A$ of 2101 kA/m, which were as high as not achieved by conventional M-type, sintered ferrite magnets.

Comparative Example 1

Magnetic Properties and Temperature Coefficient β of HcJ of Anisotropic, Sintered, Arc-Segment Ferrite Magnet at Room Temperature A calcined body was produced in the same manner as in Example 2 except for mixing to a composition of $Ca_{0.5-y}La_{0.5}Ba_yFe_{2n-z}Co_zO_{19}$ (y=0, z=0.3, and n=5.3). The calcined body was in irregular shapes substantially as in FIG. 2. This calcined body was coarsely pulverized, and finely wet-pulverized to form slurry containing fine ferrite particles having an average particle size of 0.8 μm (according to F.S.S.S.).

The slurry after fine pulverization was compression-molded at a pressure of 0.4 ton/cm² in a radially orienting magnetic field of 796 kA/m to obtain a radially oriented, arc-segment, green body (density: 2.69 g/cm³). This green body was sintered at a temperature of 1423 K, 1443 K and 1463 K, respectively, for 1 hour in the air, and machined to an outer diameter of 26.5 mm, an inner diameter of 21 mm, an x-direction length of 45 mm, and an arc angle (center angle) of 150° to obtain a radially anisotropic, sintered, arc-segment ferrite magnet.

The magnetic properties of this arc-segment ferrite magnet measured at room temperature (293 K) by a B—H tracer are shown in Table 3. The temperature coefficient β of HcJ measured between 233 K and 413 K is shown in FIG. 12.

TABLE 3

| No. | Sintering Temperature (K) | Br (mT) | HcJ (kA/m) |
|---|---|---|---|
| Example 2 | 1473 | 462.7 | 339.4 |
| | 1493 | 465.0 | 320.7 |
| | 1508 | 465.5 | 264.2 |
| Comparative Example 1 | 1423 | 453.4 | 356.8 |
| | 1443 | 460.4 | 286.0 |
| | 1463 | 463.3 | 260.6 |

Comparison at the same HcJ in FIG. 12 revealed that the temperature coefficient β of HcJ was smaller in the sintered ferrite magnets of Examples 1 and 2 than in that of Comparative Example 1. Because the sintered ferrite magnet for use in the rotating machine of the present invention containing a predetermined amount of Ba has intrinsic coercivity $HcJ_{293}$ (kA/m) at 293 K and a temperature coefficient β (%/K) of intrinsic coercivity HcJ between 233 K and 413 K meeting the conditions of $0<\beta\leq-0.0009\times HcJ_{293}+0.445$, and $HcJ_{293}\geq 264$, it provides more effective magnetic flux and less low-temperature demagnetization than those of conventional sintered ferrite magnets having the same size when assembled in a rotating machine.

Figure 11:
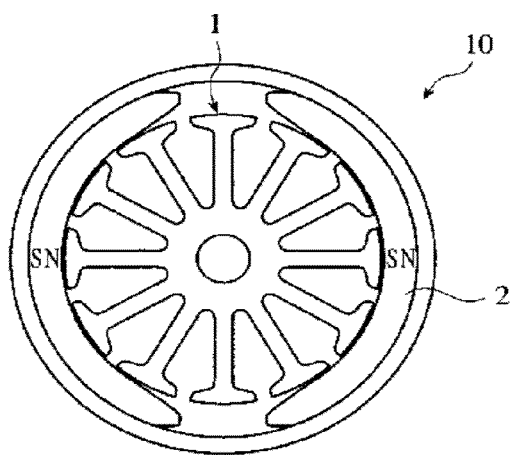
FIG. 11 is a view showing a cross section of a rotating machine comprising arc segment magnets, which is perpendicular to the centerline of the rotating machine.

Each arc-segment magnet of Example 2 and Comparative Example 1 was assembled in a stator (field magnet 2) in a motor 10 comprising an armature 1 and a field magnet 2 as shown in FIG. 11. The measurement of these two types of motors 10 at 243 K revealed that the motor 10 comprising the arc-segment magnet of Example 2 was about 1% more efficient than that comprising the arc-segment magnet of Comparative Example 1. This indicates that the arc-segment magnet of Example 2 has larger resistance to low-temperature demagnetization than that of Comparative Example 1.

Example 3

Recycling of Failed Green Bodies

Radial-two-pole, anisotropic, sintered ferrite ring magnets were produced in the same manner as in Example 1, except for using a molding slurry of fine powder having an average particle size of 0.8 μm (F.S.S.S.) formed by mixing slurry of finely pulverized calcined powder [average particle size: 0.9 μm (F.S.S.S)] obtained in Example 1 with failed green bodies (M-type ferrite structure) generated in Example 1 at ratios shown in Table 4, and lightly and finely wet-pulverizing them. The magnetic properties and β of the magnets at room temperature were measured. Their magnetic properties at room temperature and β were on the same level as those of Example 1 as shown in Table 4. It was thus verified that the failed green bodies were able to be recycled.

TABLE 4

| | Moldable Material (parts by mass) | | Br | HcJ |
|---|---|---|---|---|
| No. | Failed Green Bodies | Calcined Body | (mT) | (kA/m) |
| Example 3 | 5 | 95 | 461 | 354 |
| | 10 | 90 | 461 | 354 |
| | 50 | 50 | 460 | 355 |
| | 90 | 10 | 460 | 354 |
| | 95 | 5 | 459 | 354 |
| | 100 | 0 | 458 | 354 |
| Example 1 | 0 | 100 | 460 | 354 |

Example 4

Recycling of Pluralities of Failed Green Bodies Having Different Compositions

Radial-two-pole, anisotropic, sintered ferrite ring magnets were produced in the same manner as in Example 1, except for using slurry of dispersed fine ferrite particles having an average particle size of 0.8 μm (F.S.S.S.) obtained by mixing the failed green bodies (M-type ferrite structure) generated in Example 1 with those generated in Example 2 at ratios shown in Table 5, and lightly and finely wet-pulverizing them. Measurement revealed that they had high magnetic properties at room temperature, and substantially as low β as in Example 1, as shown in Table 5.

Although two types of failed green bodies having different ferrite compositions were used in this Example, the type of the ferrite compositions used is not restrictive. Even when 3 or more types of failed green bodies are used, high-performance, anisotropic, sintered ferrite magnets can be produced.

TABLE 5

| No. | Moldable Material (parts by mass) Failed Green Bodies (Example 1) | Failed Green Bodies (Example 2) | Br (mT) | HcJ (kA/m) |
|---|---|---|---|---|
| Example 4 | 0 | 100 | 461 | 354 |
|  | 5 | 95 | 461 | 354 |
|  | 50 | 50 | 460 | 355 |
|  | 95 | 5 | 459 | 354 |
| Example 3 | 100 | 0 | 458 | 354 |

Example 5

Recycling of Failed Sintered Bodies and Machining Dust

Coarse powder of the failed sintered bodies (M-type ferrite structure) generated in Example 1 was mixed with recycled, coarse, calcined powder (M-type ferrite structure) obtained by calcining the machining dust generated by grinding the sintered body of Example 2 under the same conditions as in Example 2, at ratios shown in Table 6. These coarse powders were finely wet-pulverized in the same manner as in Example 1 for an adjusted pulverization time to obtain molding slurries of dispersed fine ferrite particles having an average particle size of 0.75 μm (F.S.S.S.). These molding slurries were used to produce radial-two-pole, anisotropic, sintered ferrite ring magnets in the same manner as in Example 1, and their magnetic properties at room temperature and β were measured. As shown in Table 6, high magnetic properties at room temperature were obtained. Also, they had lower β than that of Example 2.

TABLE 6

| No. | Moldable Material (parts by mass) Failed Sintered Bodies (Example 1) | Recycled Calcined Bodies | Br (mT) | HcJ (kA/m) |
|---|---|---|---|---|
| Example 5 | 0 | 100 | 458 | 348 |
|  | 50 | 50 | 455 | 340 |
|  | 100 | 0 | 454 | 330 |
| Example 1 | — | — | 460 | 354 |

Although Example 5 used failed sintered bodies and machining dust having different compositions, combinations of recycled materials are not restricted thereto. For instance, at least one ferrite composition powder selected from the group consisting of failed green bodies, failed sintered bodies and machining dust may be mixed with calcined powder to form a moldable material, though any one of them preferably has an M-type ferrite structure. The use of these recycled materials can provide high-performance, anisotropic, sintered ferrite magnets with such magnetic properties as meeting $4\pi Is \geq 485$ mT, preferably $4\pi Is \geq 490$ mT, and $H_A \geq 1830$ kA/m, preferably $H_A \geq 1989$ kA/m.

Example 6

The same $CaCO_3$ powder, $La(OH)_3$ powder, $BaCO_3$ powder, $\alpha\text{-}Fe_2O_3$ powder and $Co_3O_4$ powder as in Example 1 were mixed to a composition of $Ca_{1-x-y}La_xBa_yFe_{2n-z}Co_zO_{19}$ (x=0.475, y=0.050, z=0.300, and n=5.3). The resultant mixture was wet-blended, dried, and calcined at 1473 K for 1 hour in the air. The calcined body had substantially the same structure as shown in FIG. 1. This calcined body was crushed and coarsely dry-pulverized to obtain coarse powder having an average particle size 4 μm of (F.S.S.S.). 45% by mass of the coarse powder and 55% by mass of water were charged into a ball mill, and finely wet-pulverized to form slurry of fine ferrite particles having an average particle size of 0.77 μm (F.S.S.S.). At the time of wet, fine pulverization, 0.4 parts by mass of $SiO_2$ powder and 0.5 parts by mass of $CaCO_3$ powder were added to 100 parts by mass of the coarse powder. Using this slurry, a radially anisotropic, sintered, arc-segment ferrite magnet was produced by the same molding step in a magnetic field and subsequent steps as in Example 2. The sintering condition was heating at 1493 K for 1 hour in the air. The magnetic properties of this arc-segment magnet at room temperature (293 K) were Br=468 mT, and HcJ=332 kA/m, and its β was lower than that of Comparative Example 1. A motor 10 comprising this arc-segment magnet exhibited higher efficiency than that of Comparative Example 1.

Example 7

Figure 7:
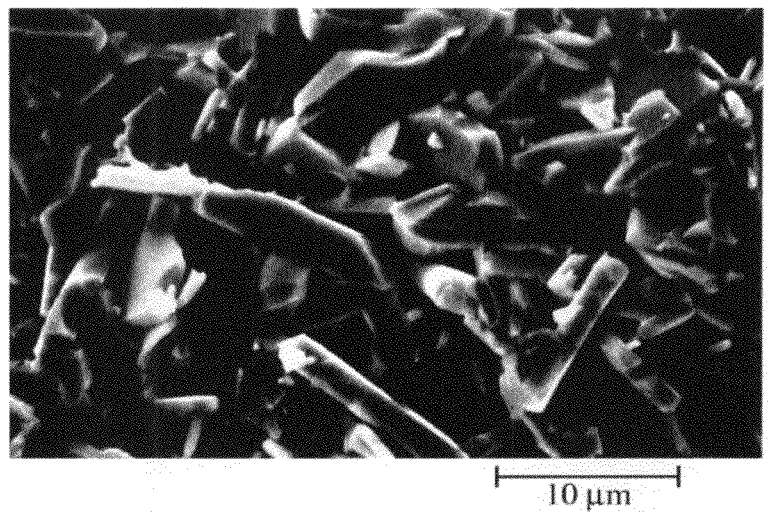
FIG. 7 is a SEM photograph showing a fractured surface of the calcined body of Example 7 of the present invention, a ferrite powder material for a bonded magnet.

$CaCO_3$ powder (purity: 98.8%, containing MgO as an impurity), $La(OH)_3$ powder (purity: 99.9%), $BaCO_3$ powder (purity: 98.1%, containing 1.45% of $SrCO_3$ as an impurity), $\alpha\text{-}Fe_2O_3$ powder (industrial grade), and $Co_3O_4$ powder (purity: 99%) were mixed to a composition of $Ca_{1-x-y}La_xBa_yFe_{2n-z}Co_zO_{19}$ (x=0.475, y=0.050, z=0.30, and n=5.3), and wet-blended. This mixture was dried, and calcined at 1473 K for 1 hour in the air. The calcined body had an M-type ferrite structure. FIG. 7 is a SEM photograph showing a fractured surface of this calcined body. It was found that primary particles in the calcined body were in a planar shape.

The calcined body was crushed, and coarsely dry-pulverized by a vibration mill to obtain coarse powder having an average particle size of 3 μm (F.S.S.S.). 0.06 parts by mass of triethanol amine and 0.1 parts by mass of ethanol were added as pulverization media to 100 parts by mass of this coarse powder, and finely dry-pulverized by a ball mill to obtain fine ferrite powder having an average particle size of 1.05 μm (according to F.S.S.S.). The finely pulverized powder particles were substantially in irregular shapes. This fine powder was heat-treated at 1153 K for 3 hours in the air. The heat-treated fine powder was immersed in water to eliminate aggregation by the heat treatment, and dried to obtain ferrite powder (M-type ferrite structure) having an average particle size of 1.1 μm (F.S.S.S.) for bonded magnets.

This ferrite powder for bonded magnets was charged into a Henschel mixer, and 0.25 parts by mass of aminosilane (KBM-603, available from Shin-Etsu Chemical Co., Ltd.) was added to 100 parts by mass of the ferrite powder while stirring to conduct a surface treatment. 89 parts by mass of the surface-treated ferrite powder was mixed with 10.7 parts by mass of 12-nylon (P-3014U, available from Ube Industries, Ltd.), and 0.3 parts by mass of stearamide (AP-1, available from Nippon Kasei Chemical Co., Ltd.) by a mixer, and heat-blended in a double-screw extruder to produce a pellet-shaped compound.

This compound was charged into an injection-molding machine to conduct injection molding at a temperature of 558 K and a pressure of 98 MPa in a radially orienting magnetic field of 318 kA/m, thereby producing a radially anisotropic, bonded magnet of 20 mm in outer diameter, 12 mm in inner diameter and 10 mm in thickness for a rotor in a rotating machine.

Comparative Example 2

Figure 8:
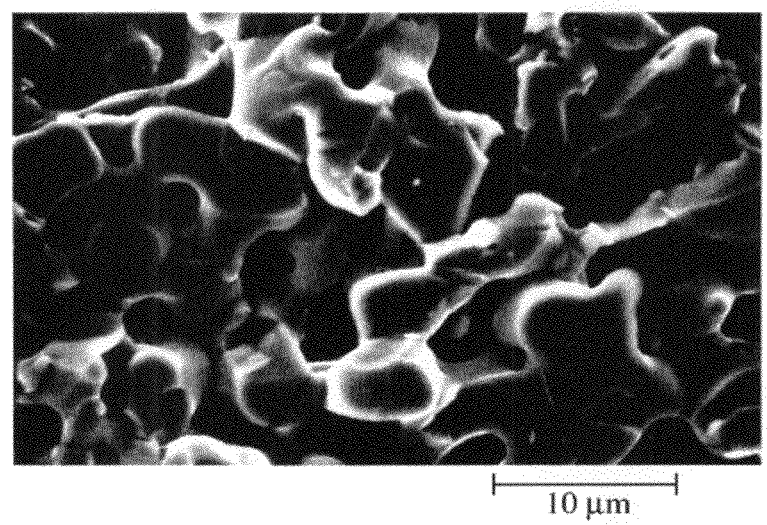
FIG. 8 is a SEM photograph showing a fractured surface of the calcined body of Comparative Example 2, a ferrite powder material for a bonded magnet.

A calcined body was produced in the same manner as in Example 1 except for blending the $CaCO_3$ powder, $La(OH)_3$ powder, α-Fe$_2$O$_3$ powder and Co$_3$O$_4$ powder used in Example 7 to a composition of Ca$_{1-x}$La$_x$Fe$_{2n-z}$Co$_z$O$_{19}$ (x=0.475, z=0.30, and n=5.3), and wet-mixing 100 parts by mass of the resultant blend with 0.1 parts by mass of H$_3$BO$_3$ powder. FIG. 8 is a SEM photograph showing a fractured surface of the calcined body. Primary particles in this calcined body were in irregular shapes. A radially anisotropic, ring-shaped, bonded magnet was produced from this calcined body in the same manner as in Example 1.

The ring-shaped, bonded magnets of Example 7 and Comparative Example 2 were magnetized to have 8 poles symmetrically under such conditions as to saturate their magnetic properties, and their surface magnetic flux densities were measured at 20° C. It was thus found that the maximum surface magnetic flux density at each magnetic pole was 4.8% higher in Example 7 than in Comparative Example 2 on average.

Example 8

The CaCO$_3$ powder, La(OH)$_3$ powder, BaCO$_3$ powder, α-Fe$_2$O$_3$ powder and Co$_3$O$_4$ powder used in Example 7 were blended to a composition of Ca$_{1-x-y}$La$_x$Ba$_y$Fe$_{2n-z}$Co$_z$O$_{19}$ (x=0.475, y=0.050, z=0.30, and n=5.3), and 100 parts by mass of the resultant blend was wet-mixed with 0.1 parts by mass of H$_3$BO$_3$ powder, and dried. 100 parts by mass of this dry mixture was dry-mixed with 2 parts by mass of NaBO$_2$-4H$_2$O and 2 parts by mass of KCl as fluxes, and calcined at 1473 K for 2 hours in the air. This calcined body had an M-type ferrite structure.

Comparison of fractured surfaces of these calcined bodies revealed that the hexagonal-plate-like shape of M-type crystal grains (primary particles) was clearer in Example 8 than in Example 7.

100 parts by mass of coarse powder obtained by crushing and sieving this calcined body was mixed with 0.08 parts by mass of triethanol amine and 0.15 parts by mass of ethanol, and lightly and finely dry-pulverized by a ball mill. The finely dry-pulverized powder was immersed in water to remove the flux, and dried. The dried fine powder had an average particle size of 1.25 μm (F.S.S.S.). The fine powder was heat-treated at 1123 K for 2 hours in the air. The heat-treated fine powder was immersed in water, and dried to obtain ferrite powder having an M-type ferrite structure for a bonded magnet, which had an average particle size of 1.3 μm (F.S.S.S.), and an aspect ratio (maximum diameter/thickness) of 1.7. Observation by SEM revealed that the ferrite powder was mainly composed of planar particles with round corners.

92.0 parts by mass of this ferrite powder was mixed with 6.8 parts by mass of EEA resin (NUC6940 available from Nippon Unicar Co., Ltd.), 0.9 parts by mass of dispersant (DH-37 available from Adeka Argus Chemical Co., Ltd.), and 0.3 parts by mass of lubricant (Slipacks E available from Nippon Kasei Chemical Co., Ltd.) by a mixer, and the resultant mixture was blended by a kneader to form a compound.

This compound was extrusion-molded by a molding apparatus shown in FIG. 16 to obtain a polar-anisotropic, cylindrical, bonded magnet 11 with five non-symmetric poles, which had an outer diameter of 16.7 mm, an inner diameter of 7 mm, and an x-direction length of 306 mm. An orienting die 70 comprised a member for generating a polar-anisotropic magnetic field for providing five non-symmetric poles (not shown), in place of the radial-orienting magnetic-field-generating member 74 shown in FIG. 17. The orienting magnetic field was 358 kA/m at a developing magnetic pole S1.

A cylindrical extrudate 11 was cut as shown in FIG. 9(a), and a shaft 81 having an outer diameter of 7 mm was fixed to a center hole of the cylindrical molding 11. The cylindrical molding 11 was then assembled in a sleeve 82 made of an aluminum alloy to obtain a magnet roll 80 shown in FIG. 9(b), which comprised a polar-anisotropic, cylindrical molding 11 with five non-symmetric poles.

Figure 14:
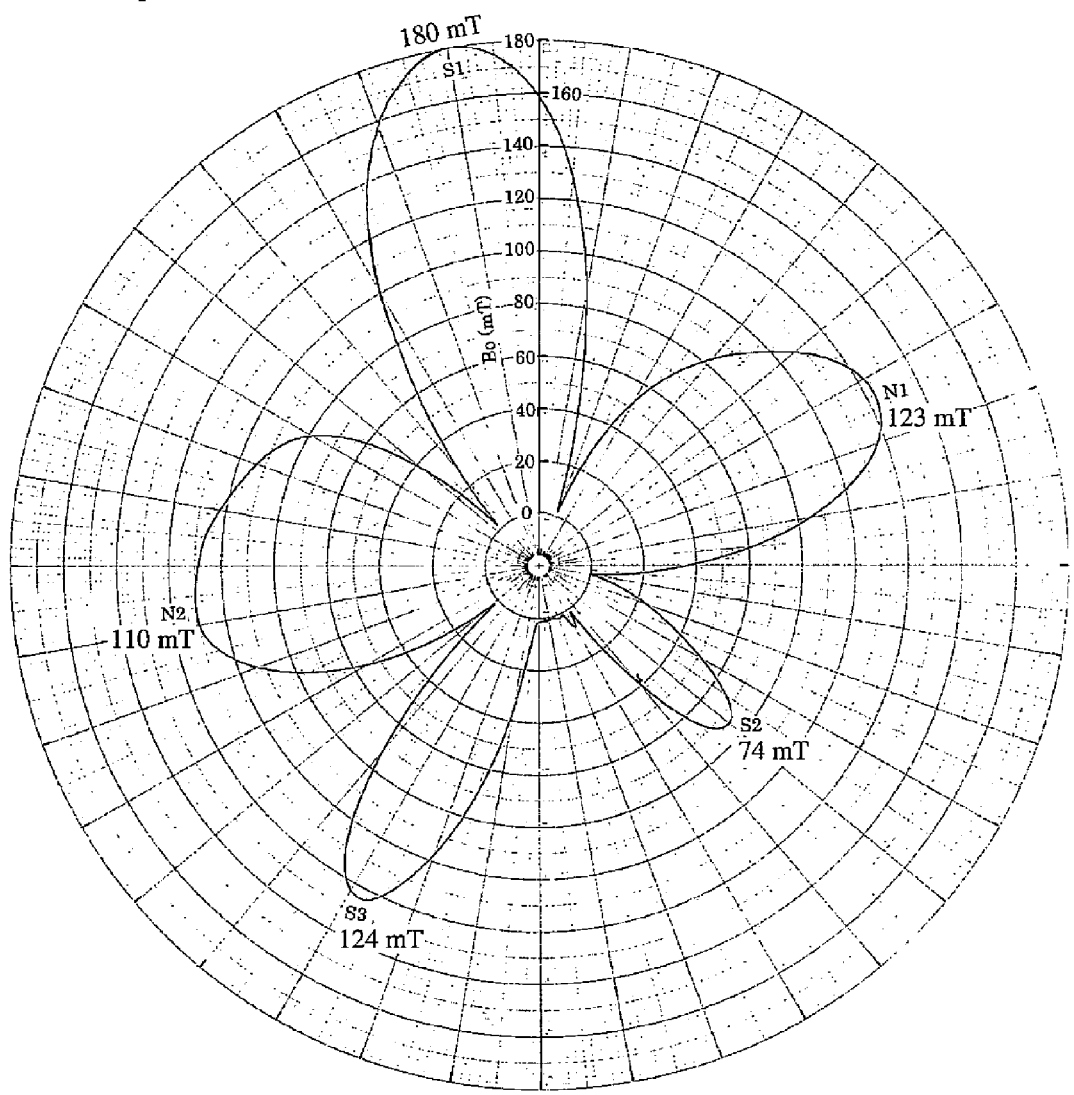
FIG. 14 is a graph showing a circumferential distribution of a surface magnetic flux density on the cylindrical bonded magnet of Example 8 of the present invention for a magnet roll.

FIG. 14 shows a measured surface magnetic flux density (B$_0$) on a surface of the cylindrical molding 11 at a center in a longitudinal direction. B$_0$ at the magnetic pole S1 was as high as 180 mT, which cannot be achieved by conventional bonded ferrite magnets. Such high magnetic properties appear to be derived from good fillability and magnetic field orientation and high magnetic properties owned by the ferrite powder of the present invention. High B$_0$ was obtained even at other magnetic poles N1, S2, S3, N2, which usually act as magnetic poles for conveying a developer (not shown), as is clear from the comparison with FIG. 15 (Conventional Example 2) described later. Accordingly, when the waveforms of B$_0$ at the other magnetic poles are adjusted, the permissible range of B$_0$ can be made wider.

Comparative Example 3

The CaCO$_3$ powder, La(OH)$_3$ powder, α-Fe$_2$O$_3$ powder and Co$_3$O$_4$ powder used in Example 7 were blended to a composition of Ca$_{1-x}$La$_x$Fe$_{2n-z}$Co$_z$O$_{19}$ (x=0.475, z=0.30, and n=5.3), and 100 parts by mass of the resultant blend was wet-mixed with 0.1 parts by mass of H$_3$BO$_3$ powder and dried. After 100 parts by mass the dry mixture was dry-mixed with 2 parts by mass of NaBO$_2$-4H$_2$O and 2 parts by mass of KCl as fluxes, calcining was conducted in the same manner as in Example 8. The resultant calcined body had primary particles in irregular shapes, unsuitable for bonded magnets.

Conventional Example 2

Figure 15:
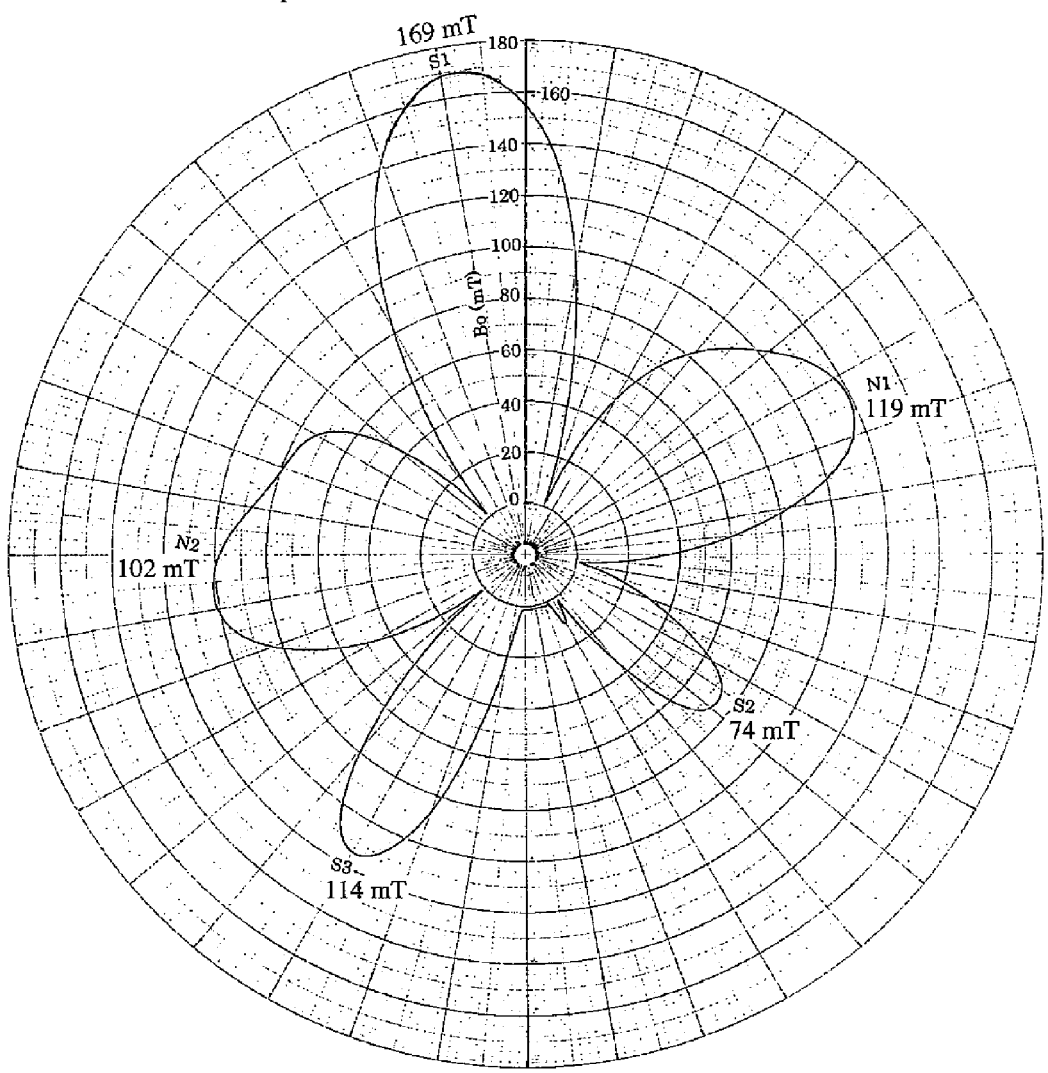
FIG. 15 is a graph showing a circumferential distribution of a surface magnetic flux density on the cylindrical bonded magnet of Conventional Example 2 for a magnet roll.

A compound comprising an EEA resin as a binder was prepared in the same manner as in Example 8, except for using commercially available Sr ferrite powder [average particle size: 1.3 μm (F.S.S.S.), and aspect ratio: 1.6] for bonded magnets in place of the ferrite powder produced in Example 8, and extrusion-molded to form a hollow, cylindrical body. FIG. 15 shows the measured B$_0$ on this cylindrical body. The B$_0$ was 169 mT at a developing magnetic pole S1, 6.1% lower than B$_0$ (=180 mT) at the pole S1 in Example 8 (FIG. 14).

Comparative Example 4

The preparation of a compound comprising an EEA resin as a binder was attempted in the same manner as in Example 8 except for using the ferrite powder produced in Comparative Example 2 in place of that produced in Example 8. However, the ferrite particles of Comparative Example 2 for bonded magnets were not sufficiently covered with the EEA binder, failing to produce a compound, because the ferrite particles of Comparative Example 2 were in irregular shapes having large specific surface areas.

Example 9

The compound produced in Example 8 was charged into an injection-molding machine, and injection-molded at a temperature of 483 K and a pressure of 120 MPa in an orienting magnetic field of 796 kA/m to produce an anisotropic, bonded magnet of 20 mm×20 mm×10 mm. The measurement of magnetic properties at 293 K by a B—H tracer revealed that this bonded magnet had Br of 308 mT and HcJ of 241 kA/m, indicating that the Br was as high as not achieved by conventional anisotropic, bonded ferrite magnets.

Conventional Example 3

An anisotropic, bonded magnet was produced in the same manner as in Example 9, except for using the compound produced in Conventional Example 2 as a moldable material. The magnetic properties of this bonded magnet were Br=290 mT, and HcJ=215 kA/m, lower than those of Example 9.

EFFECT OF THE INVENTION (1) Because the sintered ferrite magnet used in the rotating machine of the present invention has high Br and HcJ, with a small temperature dependency of HcJ (temperature coefficient β), a rotating machine having such sintered ferrite magnet suffers little low-temperature demagnetization.

(2) Because the method of the present invention for producing the sintered ferrite magnet recycles at least one of failed green bodies, failed sintered bodies and machining dust of sintered bodies as a moldable material, it can produce sintered ferrite magnets having magnetic properties equal to or higher than those of conventional, high-performance, sintered ferrite magnets at lower costs, thereby contributing to environmental protection.

(3) The bonded magnet of the present invention comprising ferrite powder and a binder has higher Br or higher Br and HcJ than those of conventional ones, suitable for magnet rolls, etc.

What is claimed is:

1. A method for producing a sintered ferrite magnet having an M-type ferrite structure, comprising Ca, an R element that is at least one of rare earth elements and indispensably includes La, Ba, Fe and Co as indispensable metal elements, and having a composition represented by the following general formula:

$$Ca_{1-x-y}R_xBa_yFe_{2n-z}Co_z, \text{ (by atomic ratio)},$$

wherein (1−x−y), x, y, z, and n represent the contents of Ca, the R element, Ba and Co, and a molar ratio, meeting
0.3≦1−x−y≦0.65,
0.2≦x≦0.65,
0.001≦y≦0.2,
0.03≦z≦0.65,
4≦n≦7, and
1−x−y>y,
said method comprising the steps of
mixing a Ca compound, an R element compound, a Ba compound, an iron compound and a Co compound as starting materials for the composition;
calcining the starting materials to obtain calcined bodies;
pulverizing the calcined bodies to obtain a calcined powder;
providing recycled materials having an M-type ferrite structure, comprising Ca, an R element that is at least one of rare earth elements and indispensably includes La, Ba, Fe and Co as indispensable metal elements, and having the same metal composition as the one represented by the above-mentioned general formula;
pulverizing the recycled materials to obtain a recycled material powder;
mixing the recycled material powder with the calcined powder to form a moldable material;
molding the moldable material to obtain green bodies; and
sintering the green bodies to obtain the sintered ferrite magnet;
wherein the mixing ratio of the recycled material powder to the calcined powder of the moldable material is 5 to 95 parts by mass to 95 to 5 parts by mass, and
wherein the recycled materials comprise at least one of failed green bodies, failed sintered bodies and dust generated in the machining of the sintered bodies.

2. The method for producing a sintered ferrite magnet according to claim 1, wherein said sintered ferrite magnet has a composition meeting 1≦x/z≦3.

3. The method for producing a sintered ferrite magnet according to claim 1, wherein said sintered ferrite magnet has a composition represented by the following general formula:

$$Ca_{1-x-y}R_xBa_yFe_{2n-z}Co_zO_\alpha, \text{ (by atomic ratio)},$$

wherein (1−x−y), x, y, z, n and α represent the contents of Ca, the R element, Ba and Co, a molar ratio, and the content of O, meeting
0.3≦1−x−y≦0.65,
0.2≦x≦0.65,
0.001≦y≦0.2,
0.03≦z≦0.65,
4≦n≦7, and
1−x−y>y,
α=19 at a stoichiometric composition in which x=z, and n=6.

4. A method for producing a sintered ferrite magnet having an M-type ferrite structure, comprising Ca, an R element that is at least one of rare earth elements and indispensably includes La, Ba, Fe and Co as indispensable metal elements, and having a composition represented by the following general formula:

$$Ca_{1-x-y}R_xBa_yFe_{2n-z}Co_z \text{ (by atomic ratio)},$$

wherein (1−x−y), x, y, z and n represent the contents of Ca, the R element, Ba and Co, and a molar ratio, meeting
0.3≦1−x−y≦0.65,
0.2≦x≦0.65,
0.001≦y≦0.2,
0.03≦z≦0.65,
4≦n≦7, and
1−x−y>y,
said method comprising the steps of
providing recycled materials having an M-type ferrite structure, comprising Ca, an R element that is at least one of rare earth elements and indispensably includes La, Ba, Fe and Co as indispensable metal elements, and having the same metal composition as the one represented by the above-mentioned general formula;
pulverizing the recycled materials to obtain a moldable material;
molding the moldable material to obtain green bodies; and
sintering the green bodies to obtain the sintered ferrite magnet;
wherein the recycled materials comprise at least one of failed green bodies, failed sintered bodies and dust generated in the machining of the sintered bodies.

5. The method for producing a sintered ferrite magnet according to claim 4, wherein said sintered ferrite magnet has a composition meeting 1≦x/z≦3.

6. The method for producing a sintered ferrite magnet according to claim 4, wherein said sintered ferrite magnet has a composition represented by the following general formula:

$$Ca_{1-x-y}R_xBa_yFe_{2n-z}Co_zO_\alpha \text{ (by atomic ratio)},$$

wherein (1−x−y), x, y, z, n and α represent the contents of Ca, the R element, Ba and Co, a molar ratio, and the content of 0, meeting $0.3 \leq 1-x-y \leq 0.65$,
$0.2 \leq x \leq 0.65$,
$0.001 \leq y \leq 0.2$,
$0.03 \leq z \leq 0.65$,
$4 \leq n \leq 7$, and
$1-x-y>y$,
$\alpha=19$ at a stoichiometric composition in which $x=z$, and $n=6$.

7. A method for producing a sintered ferrite magnet having an M-type ferrite structure, comprising Ca, an R element that is at least one of rare earth elements and indispensably includes La, Ba, Fe and Co as indispensable metal elements, and having a composition represented by the following general formula:

$$Ca_{1-x-y}R_xBa_yFe_{2n-z}Co_z, \text{ (by atomic ratio)},$$

wherein $(1-x-y)$, x, y, z, and n represent the contents of Ca, the R element, Ba and Co, and a molar ratio, meeting
$0.3 \leq 1-x-y \leq 0.65$,
$0.2 \leq x \leq 0.65$,
$0.001 \leq y \leq 0.2$,
$0.03 \leq z \leq 0.65$,
$4 \leq n \leq 7$, and
$1-x-y>y$,
said method comprising the steps of
mixing a Ca compound, an R element compound, a Ba compound, an iron compound and a Co compound as starting materials for the composition;
calcining the starting materials to obtain calcined bodies;
pulverizing the calcined bodies to obtain a calcined powder;
providing recycled materials having an M-type ferrite structure, comprising Ca, an R element that is at least one of rare earth elements and indispensably includes La, Ba, Fe and Co as indispensable metal elements, and having the same metal composition as the one represented by the above-mentioned general formula;
mixing the recycled materials with the calcined powder to form a mixture;
pulverizing the mixture to obtain a moldable material;
molding the moldable material to obtain green bodies; and
sintering the green bodies to obtain the sintered ferrite magnet;
wherein the mixing ratio of the recycled materials to the calcined powder of the moldable material is 5 to 95 parts by mass to 95 to 5 parts by mass, and
wherein the recycled materials comprise at least one of failed green bodies, failed sintered bodies and dust generated in the machining of the sintered bodies.

8. A method for producing a sintered ferrite magnet having an M-type ferrite structure, comprising Ca, an R element that is at least one of rare earth elements and indispensably includes La, Ba, Fe and Co as indispensable metal elements, and having a composition represented by the following general formula:

$$Ca_{1-x-y}R_xBa_yFe_{2n-z}Co_z, \text{ (by atomic ratio)},$$

wherein $(1-x-y)$, x, y, z, and n represent the contents of Ca, the R element, Ba and Co, and a molar ratio, meeting
$0.3 \leq 1-x-y \leq 0.65$,
$0.2 \leq x \leq 0.65$,
$0.001 \leq y \leq 0.2$,
$0.03 \leq z \leq 0.65$,
$4 \leq n \leq 7$, and
$1-x-y>y$,
said method comprising the steps of
mixing a Ca compound, an R element compound, a Ba compound, an iron compound and a Co compound as starting materials for the composition;
calcining the starting materials to obtain calcined bodies;
providing recycled materials having an M-type ferrite structure, comprising Ca, an R element that is at least one of rare earth elements and indispensably includes La, Ba, Fe and Co as indispensable metal elements, and having the same metal composition as the one represented by the above-mentioned general formula;
mixing the recycled materials with the calcined bodies to form a mixture;
pulverizing the mixture to obtain a moldable material;
molding the moldable material to obtain green bodies; and
sintering the green bodies to obtain the sintered ferrite magnet;
wherein the mixing ratio of the recycled materials to the calcined body of the moldable material is 5 to 95 parts by mass to 95 to 5 parts by mass, and
wherein the recycled materials comprise at least one of failed green bodies, failed sintered bodies and dust generated in the machining of the sintered bodies.

* * * * *